(12) United States Patent
Tsubaki et al.

(10) Patent No.: US 7,974,009 B2
(45) Date of Patent: Jul. 5, 2011

(54) IMAGE FLUCTUATION CORRECTING APPARATUS

(75) Inventors: Hisanori Tsubaki, Kanagawa-ken (JP); Tomohiko Suzuki, Kanagawa-ken (JP)

(73) Assignee: Victor Company of Japan, Limited, Yokohama-shi, Kanagawa-shi (JP)

( * ) Notice: Subject to any disclaimer, the term of this patent is extended or adjusted under 35 U.S.C. 154(b) by 498 days.

(21) Appl. No.: 12/232,503

(22) Filed: Sep. 18, 2008

(65) Prior Publication Data

US 2009/0073562 A1 Mar. 19, 2009

(30) Foreign Application Priority Data

Sep. 19, 2007 (JP) .............................. P2007-241755
Oct. 24, 2007 (JP) .............................. P2007-276640

(51) Int. Cl.
*G02B 27/64* (2006.01)
*G03B 17/00* (2006.01)

(52) U.S. Cl. ........ 359/557; 359/814; 359/824; 359/837; 396/55

(58) Field of Classification Search .................. 359/554, 359/557, 814, 824, 831, 837; 396/52, 55
See application file for complete search history.

(56) References Cited

U.S. PATENT DOCUMENTS

| | | | | |
|---|---|---|---|---|
| 5,825,545 A * | 10/1998 | Kino et al. | | 359/557 |
| 5,966,253 A * | 10/1999 | Tanaka et al. | | 359/837 |
| 7,684,685 B2 * | 3/2010 | Takahashi | | 396/55 |
| 7,742,692 B2 * | 6/2010 | Omi | | 396/55 |
| 7,860,384 B2 * | 12/2010 | Takahashi | | 396/55 |
| 7,869,702 B2 * | 1/2011 | Hayashi et al. | | 396/55 |
| 2006/0152806 A1 * | 7/2006 | Noguchi et al. | | 359/557 |
| 2007/0133092 A1 * | 6/2007 | Maeda et al. | | 359/557 |
| 2008/0292296 A1 * | 11/2008 | Ryu et al. | | 396/55 |

FOREIGN PATENT DOCUMENTS

JP 06-281889 10/1994
JP 10-104678 4/1998

* cited by examiner

*Primary Examiner* — Frank G Font
(74) *Attorney, Agent, or Firm* — The Nath Law Group; Jerald L. Meyer

(57) ABSTRACT

An image fluctuation correcting apparatus rotates a first rotary apex angle prism held in a first prism holding member around a first shaft in a direction for canceling an amount of horizontal fluctuation by electromagnetic force generated between a first drive coil and a first magnet by flowing electric current in the first drive coil. Also, the image fluctuation correcting apparatus rotates a second rotary apex angle prism held in a second prism holding member around a second shaft, which is located 180-degree angle away from the first shaft, in a direction for canceling an amount of vertical fluctuation by electromagnetic force generated between a second drive coil and a second magnet by flowing electric current in the second drive coil.

11 Claims, 12 Drawing Sheets

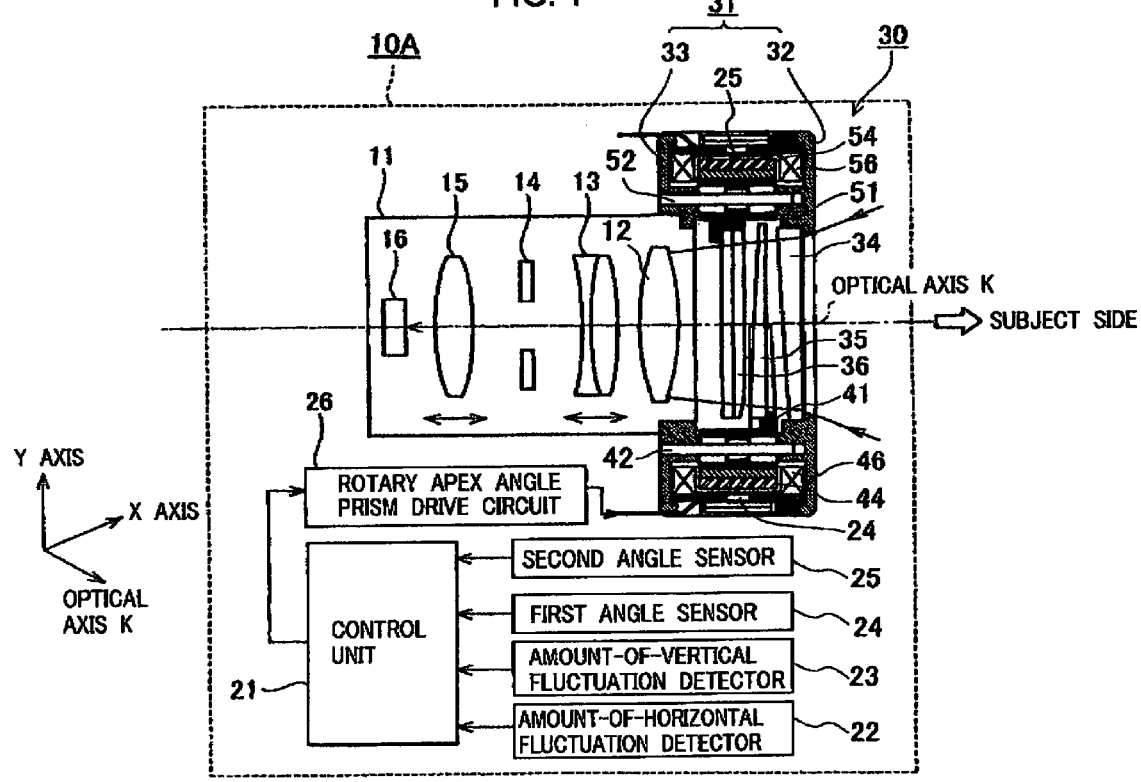

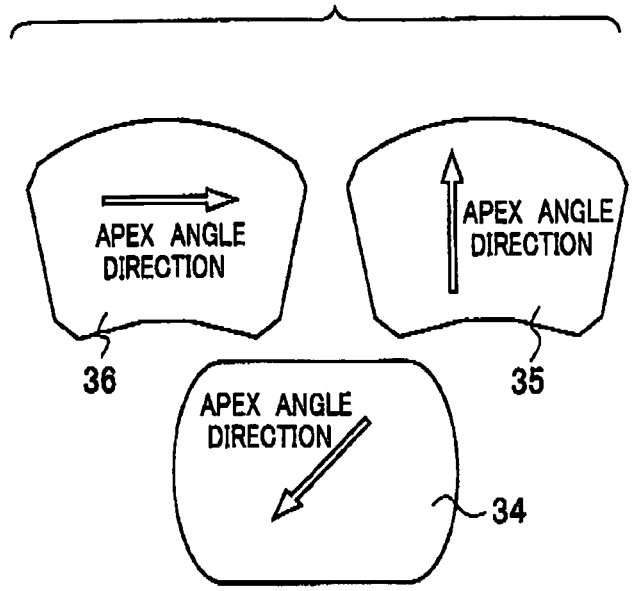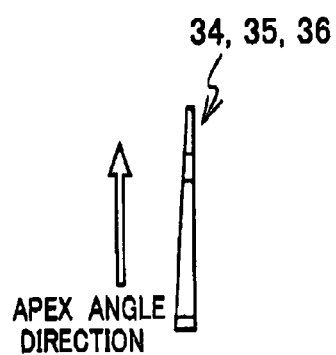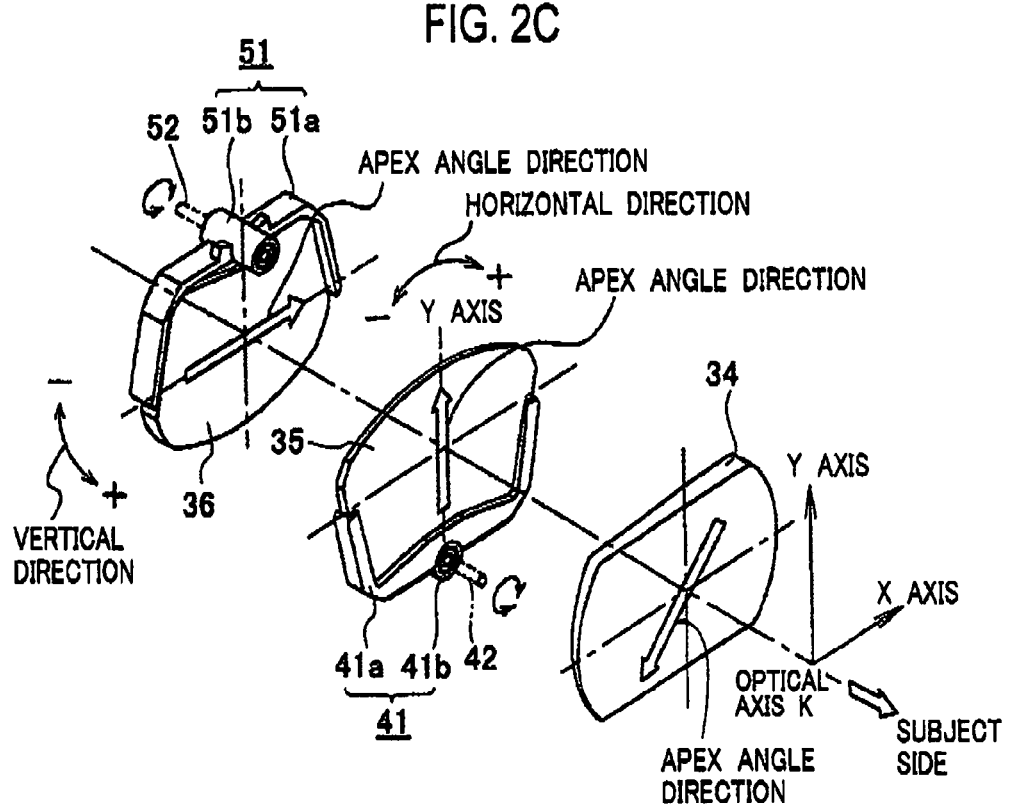

FIG. 6
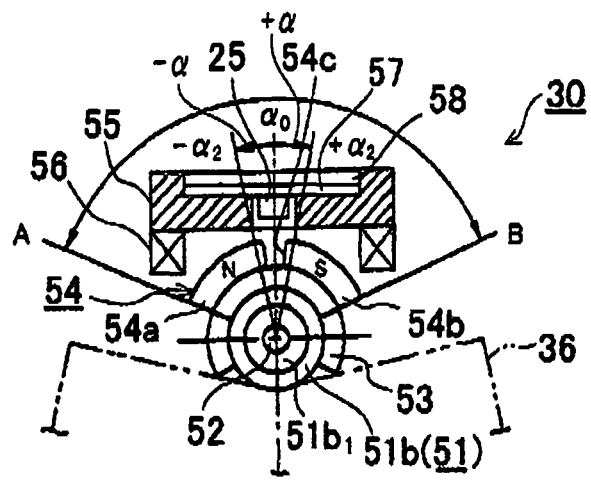
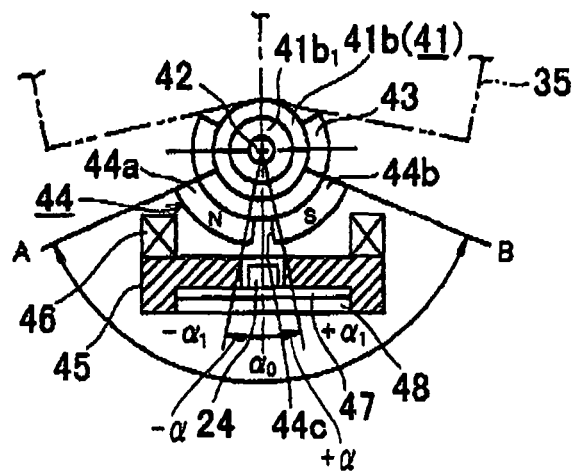
FIG. 7
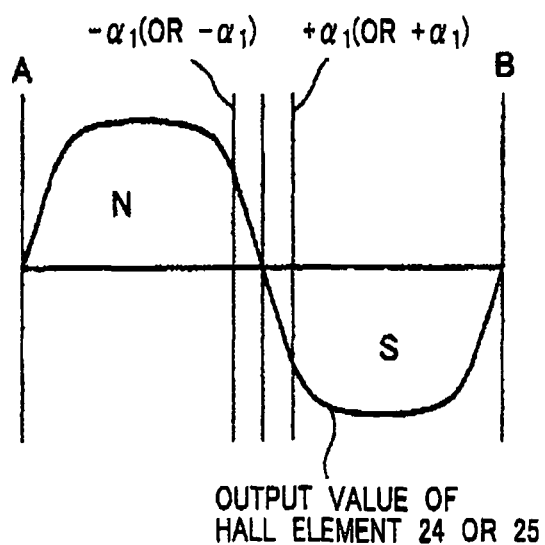
OUTPUT VALUE OF
HALL ELEMENT 24 OR 25

IMAGE FLUCTUATION CORRECTING APPARATUS

BACKGROUND OF THE INVENTION

1. Field of the Invention

The present invention relates to an image fluctuation correcting apparatus configured to rotate some of apex angle prisms along a plane nearly perpendicular to an optical axis of image lenses in a fame body arranged on the optical axis of image lenses by means of electromagnetic force according to an amount of fluctuation of a captured image, and cancel the amount of fluctuation to correct image fluctuation.

2. Description of the Related Art

An optical type fluctuation correcting apparatus (image fluctuation correcting apparatus) is conventionally applied to a video camera, an electronic still camera, a still camera or the like. The optical type fluctuation correcting apparatus optically corrects an amount of fluctuation of a captured image, which occurs due to vibration by capturing, in order to capture an image as an easily viewable image without the fluctuation of subject image.

Japanese Patent Laid-open Publication H06 (1994)-281889 discloses one example of the optical type fluctuation correcting apparatus. This optical type fluctuation correcting apparatus is provided with a pair of a concave lens and a convex lens mounted in a video camera. At least one of the concave lens and the convex lens is controlled in a direction for canceling an amount of fluctuation of a captured image. The optical type fluctuation correcting apparatus is configured to rotate at least one of the concave lens and the convex lens around a center of hypothetical curvature according to the amount of fluctuation and cause luminous flux to polarize.

Japanese Patent Laid-open Publication H10 (1998)-104678 discloses another example of the optical type fluctuation correcting apparatus. This optical type fluctuation correcting apparatus is provided with a first apex angle variable prism which is formed by a plano-concave lens and a plano-convex lens and configured to rotate in a perpendicular direction thereof, and a second apex angle variable prism which is formed by a plano-concave lens and a plano-convex lens and configured to rotate in a horizontal direction thereof. The optical type fluctuation correcting apparatus is capable of two-dimensionally varying a transmissive optical axis by rotating the first and second apex angle variable prisms according to an amount of fluctuation and composing rotation angles of the first and second apex angle variable prisms.

The optical type fluctuation correcting apparatus disclosed in Japanese Patent Laid-open Publication H06 (1994)-281889 can rotate at least one of the concave lens and the convex lens around a center of hypothetical curvature according to the amount of fluctuation and cause luminous flux to polarize. However, if this optical type fluctuation correcting apparatus rotates the convex lens by using a convex lens rotation means, the configuration of convex lens rotation means becomes complex and large in size because the convex lens rotation means is composed of a pair of upper and lower convex lens support members that support the convex lens, a pair of left and right convex lens perpendicular rotation members that respectively rotate the pair of upper and lower convex lens support members in a perpendicular direction thereof, a convex lens horizontal rotation member that is mounted between the pair of left and right convex lens perpendicular rotation members and rotates the pair of left and right convex lens perpendicular rotation members in a horizontal direction thereof, an electromagnetic means for perpendicularly rotating the convex lens and an electromagnetic means for horizontally rotating the convex lens. Therefore, it is difficult to downsize the optical type fluctuation correcting apparatus because it needs space for installing these constructional members.

The optical type fluctuation correcting apparatus disclosed in Japanese Patent Laid-open Publication H10 (1998)-104678 can two-dimensionally vary a transmissive optical axis by rotating the first and second apex angle variable prisms according to an amount of fluctuation and composing rotation angles of the first and second apex angle variable prisms. However, if this optical type fluctuation correcting apparatus rotates the first and second apex angle variable prisms by using a lens rotation means, the configuration of lens rotation means becomes large in size because the lens rotation means causes a pinion mounted on an axis of motor to mesh with a rack mounted on a side wall side of each apex angle variable prism. Therefore, it is difficult to downsize the optical type fluctuation correcting apparatus because it needs space for installing these constructional members.

SUMMARY OF THE INVENTION

The present invention has an object to provide an image fluctuation correcting apparatus configured to realize a simple and small structure.

In order to achieve the above object, the present invention provides an image fluctuation correcting apparatus that rotates one or more apex angle prisms along a plane nearly perpendicular to an optical axis of image lenses in a frame body arranged on the optical axis of image lenses by means of electromagnetic force according to an amount of fluctuation of a captured image, and cancels the amount of fluctuation to correct image fluctuation, comprising: one or more shafts that are substantially parallel to the optical axis and laterally installed in the frame body; one or more prism holding members that each includes a frame portion holding one apex angle prism and a shaft bush portion connected to the frame portion so as to be perpendicular to the one apex angle prism, and capable of rotating around a corresponding shaft fitted to the shaft bush portion within a predetermined angle range, together with the one apex angle prism; one or more rotary yokes that each is fixed to a corresponding shaft bush portion so as to be located at a side opposed to a corresponding frame portion; one or more magnets that each is magnetized into a N pole and a S pole and fixed to the corresponding shaft bush portion so as to be located at the side opposed to the corresponding frame portion; one or more back yokes that each is attached to an outer peripheral portion of the frame body; and one or more drive coils that each is wound so as to surround a corresponding magnet and attached to the outer peripheral portion of the frame body, wherein one apex angle prism is rotated together with a corresponding prism holding member by electromagnetic force generated between a corresponding magnet and a corresponding drive coil by flowing in the corresponding drive coil electric current for rotating the corresponding prism holding member in a direction for canceling the amount of fluctuation.

According to the present invention, since the image fluctuation correcting apparatus has the above-described structure, it realizes a simple and small structure. Further, since the image fluctuation correcting apparatus has the above-described feature, it realizes that a good image of subject is obtained.

In a preferred embodiment of the present invention, in a reference position where the corresponding prism holding member holding the one apex angle prism does not rotate, bias force acts to the corresponding drive coil in which the electric current does not flow so that a flux content of the N pole of the corresponding magnet is about the same as one of the S pole of the corresponding magnet, which keeps the one apex angle prism at a center position of the predetermined angle range.

According to the embodiment, since the image fluctuation correcting apparatus has the above-described feature, it keeps the apex angle prism at the center position of the predetermined angle range in the reference position, without being affected by a capture position of video camera.

In a preferred embodiment of the present invention, the one or more apex angle prisms are composed of a fixed apex angle prism fixed in the frame body, a first rotary apex angle prism to be rotated according to an amount of horizontal fluctuation, and a second rotary apex angle prism to be rotated according to an amount of vertical fluctuation, the one or more shafts are composed of a first shaft, and a second shaft located 180-degree angle away from the first shaft, and the one or more prism holding members are composed of a first prism holding member rotatably supported by the first shaft and holding the first rotary apex angle prism, and a second prism holding member rotatably supported by the second shaft and holding member holding the second rotary apex angle prism.

According to the embodiment, since the image fluctuation correcting apparatus has the above-described symmetrical structure, it realizes a simple and small structure.

In order to achieve the above object, the present invention provides an image fluctuation correcting apparatus that rotates one or more apex angle prisms along a plane nearly perpendicular to an optical axis of image lenses in a frame body arranged on the optical axis of image lenses by means of electromagnetic force according to an amount of fluctuation of a captured image, and cancels the amount of fluctuation to correct image fluctuation, comprising: one or more shafts that are substantially parallel to the optical axis and laterally installed in the frame body; one or more prism holding members that each includes a frame portion holding one apex angle prism and a shaft bush portion connected to the frame portion so as to be perpendicular to the one apex angle prism, and capable of rotating around a corresponding shaft fitted to the shaft bush portion within a predetermined angle range, together with the one apex angle prism; one or more rotary yokes that each is fixed to a corresponding shaft bush portion so as to be located at a side opposed to a corresponding frame portion; one or more magnets that each is magnetized into a N pole and a S pole and fixed to the corresponding shaft bush portion so as to be located at the side opposed to the corresponding frame portion; one or more back yokes that each is attached to an outer peripheral portion of the frame body; one or more drive coils that each is wound so as to surround a corresponding magnet and attached to the outer peripheral portion of the frame body; and one or more hall elements that each is attached to the outer peripheral portion of the frame body so as to be opposed to a magnetic gap portion of the corresponding magnet in a reference position where the corresponding prism holding member holding the one apex angle prism does not rotate, wherein, in a condition where a width of the magnetic gap portion of a corresponding magnet is set to a predetermined gap width in which a magnetic flux density linearly increases, a corresponding hall element detects a rotation angle of one apex angle prism rotated together with a corresponding prism holding member.

According to the present invention, since the image fluctuation correcting apparatus has the above-described structure, it surely and easily detects the rotation angle of the apex angle prism.

In order to achieve the above object, the present invention provides an image fluctuation correcting apparatus that rotates a first apex angle prism and a second apex angle prism along a plane nearly perpendicular to an optical axis of image lenses in a frame body arranged on the optical axis of image lenses by means of electromagnetic force according to an amount of fluctuation of a captured image, and cancels the amount of fluctuation to correct image fluctuation, comprising: a shaft that is substantially parallel to the optical axis and laterally installed in the frame body; a first prism holding member that includes a frame portion holding the first apex angle prism and a shaft bush portion connected to the frame portion so as to be perpendicular to the first apex angle prism, and capable of rotating around the shaft fitted to the shaft bush portion within a predetermined angle range, together with the first apex angle prism; a second prism holding member that includes a frame portion holding the second apex angle prism and is opposed to the first apex angle prism and a shaft bush portion connected to the frame portion so as to be perpendicular to the second apex angle prism, and capable of rotating around the shaft fitted to the shaft bush portion within a predetermined angle range, together with the second apex angle prism; a first electromagnetic actuator that rotates the first prism holding member holding the first apex angle prism in a direction for canceling the amount of fluctuation; and a second electromagnetic actuator that rotates the second prism holding member holding the second apex angle prism in a direction for canceling the amount of fluctuation.

According to the present invention, since the image fluctuation correcting apparatus has the above-described structure, it reduces the number of members.

In a preferred embodiment of the present invention, the first electromagnetic actuator comprises: a first drive coil board with a first drive coil that is attached to a member attachment portion connected to the frame portion so as to be located at a side opposed to the shaft bush portion of the first prism holding member; a first magnet that is fixed to one surface side in the frame body so as to be opposed to the first drive coil board; a first yoke that is fixed to the one surface side in the frame body so as to be opposed to the first drive coil board; and a first back yoke that is fixed in the frame body so as to be opposed to the first yoke via the first drive coil board, and the second electromagnetic actuator comprises: a second drive coil board with a second drive coil that is attached to a member attachment portion connected to the frame portion so as to be located at a side opposed to the shaft bush portion of the second prism holding member; a second magnet that is fixed to the other surface side in the frame body so as to be opposed to the first drive coil board; a second yoke that is fixed to the other surface side in the frame body so as to be opposed to the second drive coil board; and a second back yoke that is fixed in the frame body so as to be opposed to the second yoke via the second drive coil board.

According to the embodiment, since the image fluctuation correcting apparatus has the above-described structure, it realizes a simple and small structure.

In a preferred embodiment of the present invention, the first electromagnetic actuator comprises: a first yoke that is attached to a member attachment portion connected to the frame portion so as to be located at a side opposed to the shaft bush portion of the first prism holding member; and a first magnet that is attached to the member attachment portion connected to the frame portion so as to be located at the side opposed to the shaft bush portion of the first prism holding member; a first drive coil board with a first drive coil that is fixed to one surface side in the frame body so as to be opposed to the first magnet; and a first back yoke that is fixed to the one surface side in the frame body so as to be opposed to the first magnet, and the second electromagnetic actuator comprises: a second yoke that is attached to a member attachment portion connected to the frame portion so as to be located at a side opposed to the shaft bush portion of the second prism holding member; and a second magnet that is attached to the member attachment portion connected to the frame portion so as to be located at the side opposed to the shaft bush portion of the second prism holding member; a second drive coil board with a second drive coil that is fixed to the other surface side in the frame body so as to be opposed to the second magnet; and a second back yoke that is fixed to the other surface side in the frame body so as to be opposed to the second magnet.

According to the embodiment, since the image fluctuation correcting apparatus has the above-described structure, it prevents the first and second drive coils from being broken.

In a preferred embodiment of the present invention, in a reference position where the first prism holding member holding the first apex angle prism does not rotate, bias force acts to the first drive coil in which electric current does not flow so that a flux content of a N pole of the first magnet is about the same as one of a S pole of the first magnet, which keeps the first apex angle prism at a center position of the predetermined angle range, and in a reference position where the second prism holding member holding the second apex angle prism does not rotate, bias force acts to the second drive coil in which electric current does not flow so that a flux content of a N pole of the second magnet is about the same as one of a S pole of the second magnet, which keeps the second apex angle prism at a center position of the predetermined angle range.

According to the embodiment, since the image fluctuation correcting apparatus has the above-described feature, it keeps the first and second apex angle prisms at the center position of the predetermined angle range in the reference position, without being affected by a capture position of video camera.

In a preferred embodiment of the present invention, a first hall element that detects a rotation angle of the first apex angle prism is mounted to the first drive coil board so as to be opposed to the first magnet, and a second hall element that detects a rotation angle of the second apex angle prism is mounted to the second drive coil board so as to be opposed to the second magnet.

According to the embodiment, since the image fluctuation correcting apparatus has the above-described structure, it surely and easily detects the rotation angles of the first and second apex angle prisms.

BRIEF DESCRIPTION OF THE DRAWINGS

FIG. 1 is a configuration diagram of a video camera to which an image fluctuation correcting apparatus is applied, according to a first exemplary embodiment of the present invention.

FIGS. 2A, 2B and 2C are a front view, a side view and a perspective view respectively for explaining a fixed apex angle prism, a first rotary apex angle prism and a second rotary apex angle prism mounted in the image fluctuation correcting apparatus according to the first exemplary embodiment of the present invention.

FIG. 6 is an explanatory diagram of operation for detecting rotating actions and rotation positions of the first and second rotary apex angle prisms, in the image fluctuation correcting apparatus according to the first exemplary embodiment of the present invention.

FIG. 7 is a graph showing output of a first angle sensor or a second angle sensor using a hall element in the image fluctuation correcting apparatus according to the first exemplary embodiment of the present invention.

DESCRIPTION OF THE PREFERRED EMBODIMENTS

First Exemplary Embodiment

Figure 3A:
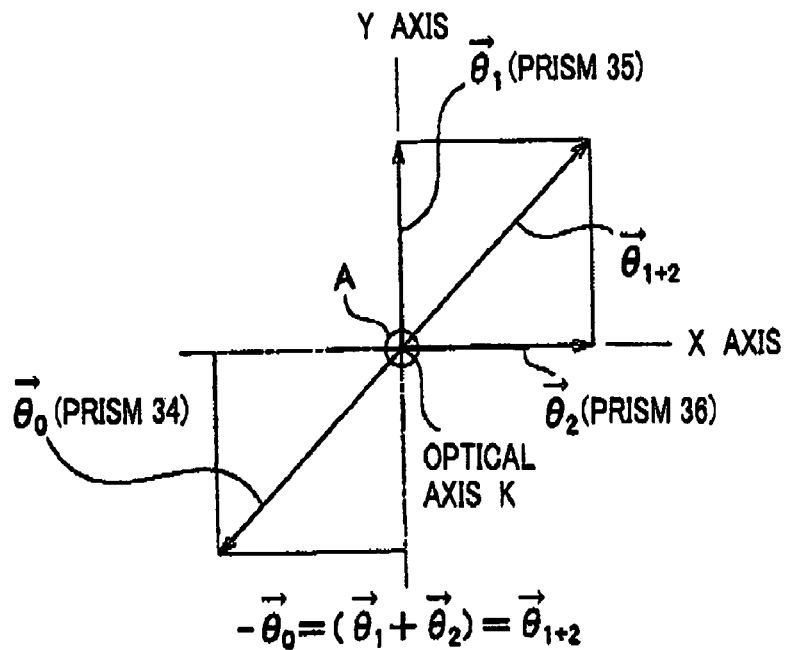
FIGS. 3A and 3B are explanatory diagrams of operation principle of polarization of luminous flux by the fixed apex angle prism, the first rotary apex angle prism and the second rotary apex angle prism.

An image fluctuation correcting apparatus 30 according to a first exemplary embodiment of the present invention will be described below in detail, with reference to FIGS. 1 to 7.

As shown in FIG. 1, a video camera 10A includes therein the image fluctuation correcting apparatus 30 mounted to a front region of a lens tube 11. In the image fluctuation correcting apparatus 30, a frame body 31 can be divided into a front frame body 32 and a rear frame body 33. The front frame body 32 abuts on the rear frame body 33 and integrally connected to the rear frame body 33, which forms the frame body 31. In the frame body 31, a fixed apex angle prism 34, a first rotary apex angle prism 35 and a second rotary apex angle prism 36 are arranged in this order from a front side (subject side) of the lens tube 11. The fixed apex angle prism 34 is fixed to the front side of the lens tube 11. The first rotary apex angle prism 35 rotates (pivots) together with a first prism holding member 41 around a first shaft 42, which is substantially parallel to an optical axis K, within a predetermined angle range and along a plane nearly perpendicular to the optical axis K, by means of electromagnetic force, according to an amount of horizontal fluctuation (or vertical fluctuation) of the video camera 10A. The second rotary apex angle prism 36 rotates (pivots) together with a second prism holding member 51 around a second shaft 52, which is substantially parallel to the optical axis K, within a predetermined angle range and along a plane nearly perpendicular to the optical axis K, by means of electromagnetic force, according to an amount of vertical fluctuation (or horizontal fluctuation) of the video camera 10A.

In this configuration, the image fluctuation correcting apparatus 30 may rotate one of the first and second rotary apex angle prisms 35 and 36 according to the amount of horizontal fluctuation of the video camera 10A, and rotate the other of the first and second rotary apex angle prisms 35 and 36 according to the amount of vertical fluctuation of the video camera 10A. In this exemplary embodiment, the image fluctuation correcting apparatus 30 rotates the first rotary apex angle prism 35 according to the amount of horizontal fluctuation of the video camera 10A, and rotates the second rotary apex angle prism 36 according to the amount of vertical fluctuation of the video camera 10A.

In the lens tube 11, a front lens (or a front lens group) 12, a variable power lens (or a variable power lens group) 13, an iris 14, a focus lens (or a focus lens group) 15 and an image pickup element 16 are arranged in this order from the subject side of the lens tube 11. The front lens 12 captures a subject along the optical axis K. The variable power lens 13 is capable of move along the optical axis K to vary a size of subject image (zoom a subject image) captured by the front lens 12. The iris 14 is capable of opening or closing to adjust an amount of light of subject image. The focus lens 15 is capable of moving along the optical axis K to adjust a focus of subject image. The image pickup element 16 carries out a photoelectric convert with respect to a subject image. In this configuration, the optical axis K of the image fluctuation correcting apparatus 30 is identical to that of each lens (or element) in the lens tube 11.

In the video camera 10A, a control unit 21, an amount-of-horizontal fluctuation detector 22, an amount-of-vertical fluctuation detector 23, a first angle sensor 24, a second angle sensor 25 and a rotary apex angle prism drive circuit 26 are mounted. The control unit 21 controls the whole of video camera 10A. The amount-of-horizontal fluctuation detector 22 detects an amount of horizontal fluctuation of the video camera 10A when the video camera 10A vibrates in a lateral direction with respect to Y axis perpendicular to the optical axis K. The amount-of-vertical fluctuation detector 23 detects an amount of vertical fluctuation of the video camera 10A when the video camera 10A vibrates in a longitudinal direction with respect to X axis perpendicular to the optical axis K and the Y axis. The first angle sensor 24 detects a rotation angle of the first rotary apex angle prism 35 rotating according to the amount of horizontal fluctuation of the video camera 10A. The second angle sensor 25 detects a rotation angle of the second rotary apex angle prism 36 rotating according to the amount of vertical fluctuation of the video camera 10A. The rotary apex angle prism drive circuit 26 rotates the first rotary apex angel prism 35 and/or the second rotary apex angle prism 36 within the predetermined angel range(s).

In this configuration, the amount-of-horizontal fluctuation detector 22 and the amount-of-vertical fluctuation detector 23 are well-known angular velocity sensors. A detector plane of the amount-of-horizontal fluctuation detector 22 faces to the horizontal direction (X axis direction) of the video camera 10A. The amount-of-horizontal fluctuation detector 22 detects an angular velocity due to horizontal fluctuation of the video camera 10A and outputs an amount of horizontal fluctuation corresponding to the detected angular velocity into the control unit 21. A detector plane of the amount-of-vertical fluctuation detector 23 faces to the vertical direction (Y axis direction) of the video camera 10A. The amount of vertical fluctuation detector 23 detects an angular velocity due to vertical fluctuation of the video camera 10A and outputs an amount of vertical fluctuation corresponding to the detected angular velocity into the control unit 21.

The first angle sensor 24 and the second angle sensor 25 use hall elements for converting magnetic flux density change into voltage. The first angle sensor 24 detects magnetic flux density of a first magnet 44 mounted in the vicinity of the first prism holding member 41 which holds the first rotary apex angle prism 35, by means of the hall element, and outputs the detection result into the control unit 21. The control unit 21 controls a rotation position of the first rotary apex angle prism 35 using the rotary apex angle prism drive circuit 26. The control unit 21 locates the first rotary apex angle prism 35 in a reference position at an initial time when the first rotary apex angle prism 35 does not rotate. The second angle sensor 25 detects magnetic flux density of a second magnet 54 mounted in the vicinity of the second prism holding member 51 which holds the second rotary apex angle prism 36, by means of the hall element, and outputs the detection result into the control unit 21. The control unit 21 controls a rotation position of the second rotary apex angle prism 36 using the rotary apex angle prism drive circuit 26. The control unit 21 locates the second rotary apex angle prism 36 in a reference position at an initial time when the second rotary apex angle prism 36 does not rotate.

The rotary apex angle prism drive circuit 26 supplies coil drive current to a first drive coil 46 or a second drive coli 56 according to the amount of horizontal fluctuation or the amount of vertical fluctuation.

As shown in FIGS. 2A and 2B, each of the fixed apex angle prism 34, the first rotary apex angle prism 35 and the second rotary apex angle prism 36 is made with transparent glass or transparent resin material and formed in a substantial fan shape in a small size as possible with respect to a capture screen. Each of apex angles of the fixed apex angle prism 34, the first rotary apex angle prism 35 and the second rotary apex angle prism 36 has the same value as other apex angles. Each of the fixed apex angle prism 34, the first rotary apex angle prism 35 and the second rotary apex angle prism 36 is a luminous flux polarization optical member that becomes thinner toward an apex angle direction.

In this configuration, as shown in FIG. 2C, the apex angle direction of fixed apex angle prism 34 fixed in the frame body 31 is set to always point to a lower oblique left (e.g. −45 degree angle direction) of the frame body 31 as viewed from the subject side.

The first rotary apex angle prism 35 is held in a concave guard fame portion 41*a* of the first prism holding member 41 at a lower end and right and left sides thereof. The first shaft 42 is fitted to a shaft bush portion 41*b* that is mounted on the center portion of concave guard frame portion 41*a* and extends so as to be perpendicular to the concave guard frame portion 41*a*. The first rotary apex angle prism 35 is capable of rotating around the first shaft 42. The apex angle direction of the first rotary apex angle prism 35 is set to be parallel to the Y axis perpendicular to the optical axis K at the initial time, and rotates in the horizontal direction to slant within the predetermined angle range with respect to the Y axis, according to the amount of horizontal fluctuation.

The second rotary apex angle prism 36 is held in a concave guard fame portion 51*a* of the second prism holding member 51 at an upper end and right and left sides thereof. The second shaft 52 is fitted to a shaft bush portion 51*b* that is mounted on the center portion of concave guard frame portion 51*a* and extends so as to be perpendicular to the concave guard frame portion 51*a*. The second rotary apex angle prism 36 is capable of rotating around the second shaft 52. The apex angle direction of the second rotary apex angle prism 36 is set to be parallel to the X axis perpendicular to the optical axis K and the Y axis at the initial time, and rotates in the vertical direction to slant within the predetermined angle range with respect to the X axis, according to the amount of vertical fluctuation.

Accordingly, the apex angle direction of first rotary apex angle prism 35 is perpendicular to that of second rotary apex angle prism 36.

As shown in FIG. 3A, at the initial time, $\vec{\theta}0$, $\vec{\theta}1$ and $\vec{\theta}2$ respectively indicate image shift vectors corresponding to the apex angle directions of fixed apex angle prism 35, first rotary apex angle prism 35 and second rotary apex angle prism 36.

At the initial time, the apex angle directions of fixed apex angle prism 34, first rotary apex angle prism 35 and second rotary apex angle prism 36 are set so that a resultant vector $\vec{\theta}1+2$ with respect to the image shift vectors $\vec{\theta}1$ and $\vec{\theta}2$ is canceled by the image shift vector $\vec{\theta}0$. Therefore, a function realized by the fixed apex angle prism 35, the first rotary apex angle prism 35 and the second rotary apex angle prism 36 is equivalent to one of a parallel plate. As a result, since an incident angle of light beam from a subject is the same as an output angle of light beam from the second rotary apex angle prism 36, which means that the light beam is not reflected, an image A of subject on the optical axis K is output without moving.

Figure 3B:
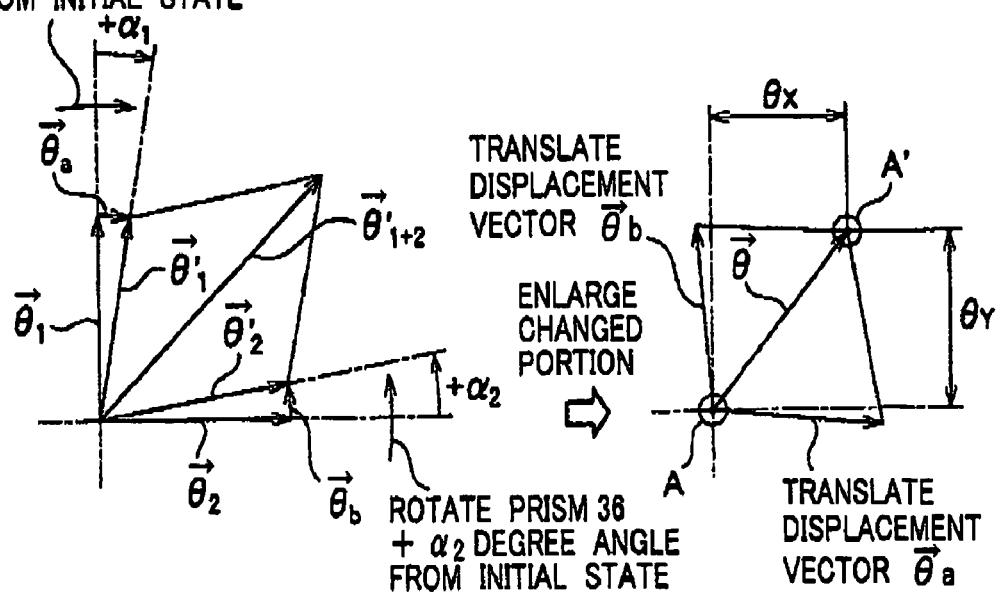

FIG. 3B shows a state that the first rotary apex angle prism 35 is rotated, for example, +α1 degree angle from an initial state according to the amount of horizontal fluctuation and the second rotary apex angle prism 36 is rotated, for example, +α2 degree angle from an initial state according to the amount of vertical fluctuation.

At the time when the first rotary apex angle prism 35 and the second rotary apex angle prism 36 rotate, the image shift vector of the first rotary apex angle prism 35 shifts from $\vec{\theta}1$ to $\vec{\theta}'1$ and the image shift vector of the second rotary apex angle prism 36 shifts from $\vec{\theta}2$ to $\vec{\theta}'2$. Therefore, since a resultant vector $\vec{\theta}'1+2$ with respect to the image shift vectors $\vec{\theta}'1$ and $\vec{\theta}'2$ is not on a line extended from the image shift vector $\vec{\theta}0$, the light beam is reflected.

In this situation, a resultant vector $\vec{\theta}0$ is obtained by translating a displacement vector $\vec{\theta}a$ of the first rotary apex angle prism 35 and a displacement vector $\vec{\theta}b$ of the second rotary apex angle prism 36 and then composing the displacement vectors $\vec{\theta}a$ and $\vec{\theta}b$. If we assume that component vectors of the resultant vector $\vec{\theta}$ are defined as $\vec{\theta}X$ and $\vec{\theta}Y$, as shown in FIG. 3B, the image A of subject on an original point of X-Y coordinate is shifted to an image A' of subject in a first quadrant of X-Y coordinate.

Thus, when the first rotary apex angle prism 35 is rotated in the horizontal direction to slant within the predetermined angle range with respect to the Y axis according to the amount of horizontal fluctuation and the second rotary apex angle prism 36 is rotated in the vertical direction to slant with the predetermined angle range with respect to the X axis according to the amount of vertical fluctuation, the image A of subject is adequately shifted in one of first to fourth quadrants of X-Y coordinate. Therefore, even if the video camera 10A vibrates in the horizontal and/or vertical directions thereof, the image fluctuation correcting apparatus 30 shifts the image A of subject in a direction for compensating the displacement of video camera 10A to cancel the horizontal fluctuation and/or the vertical fluctuation of video camera 10A. This gives us a good image of subject.

Figure 4:
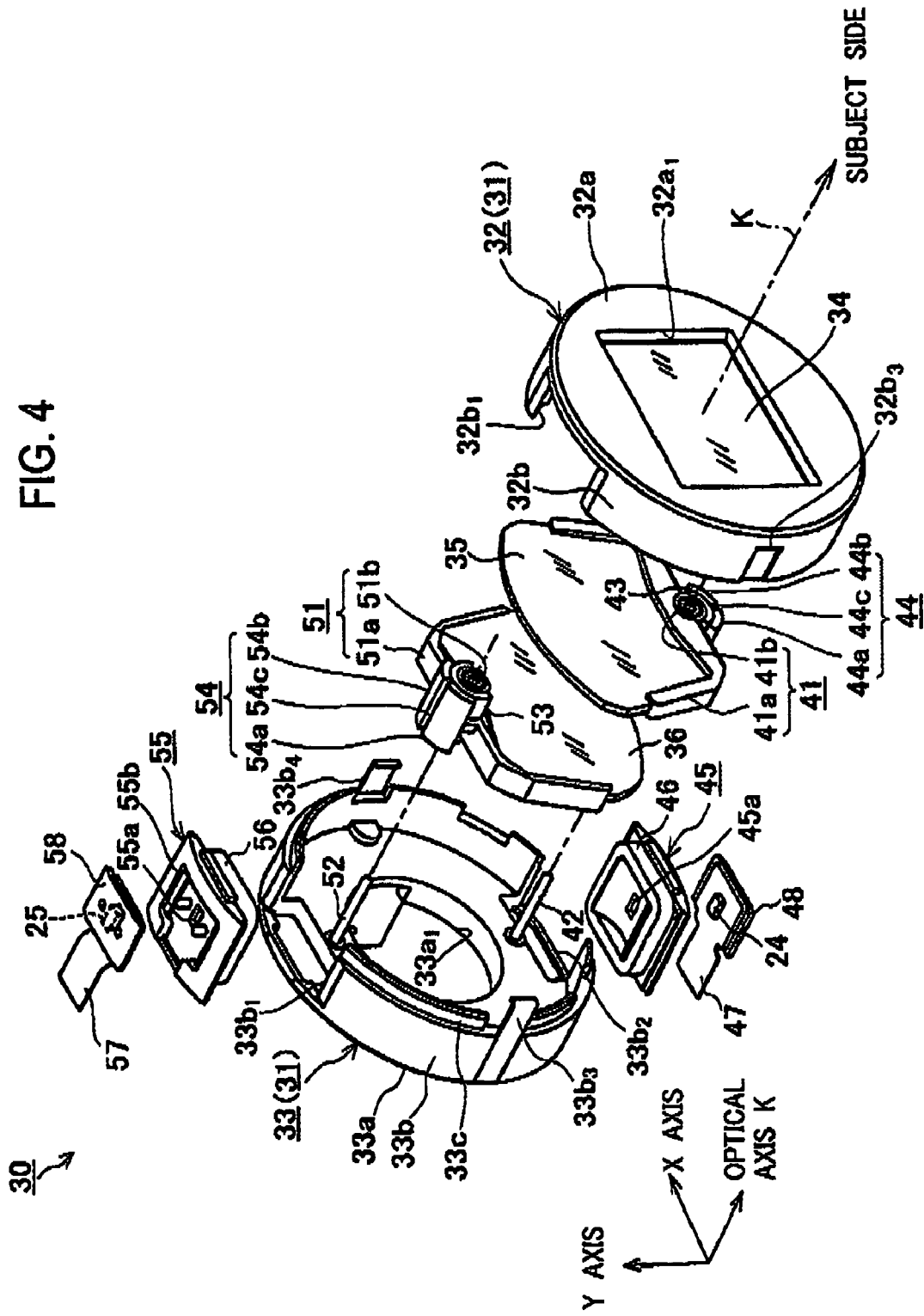
FIG. 4 is an exploded perspective view of the image fluctuation correcting apparatus according to the first exemplary embodiment of the present invention.
Figure 5:
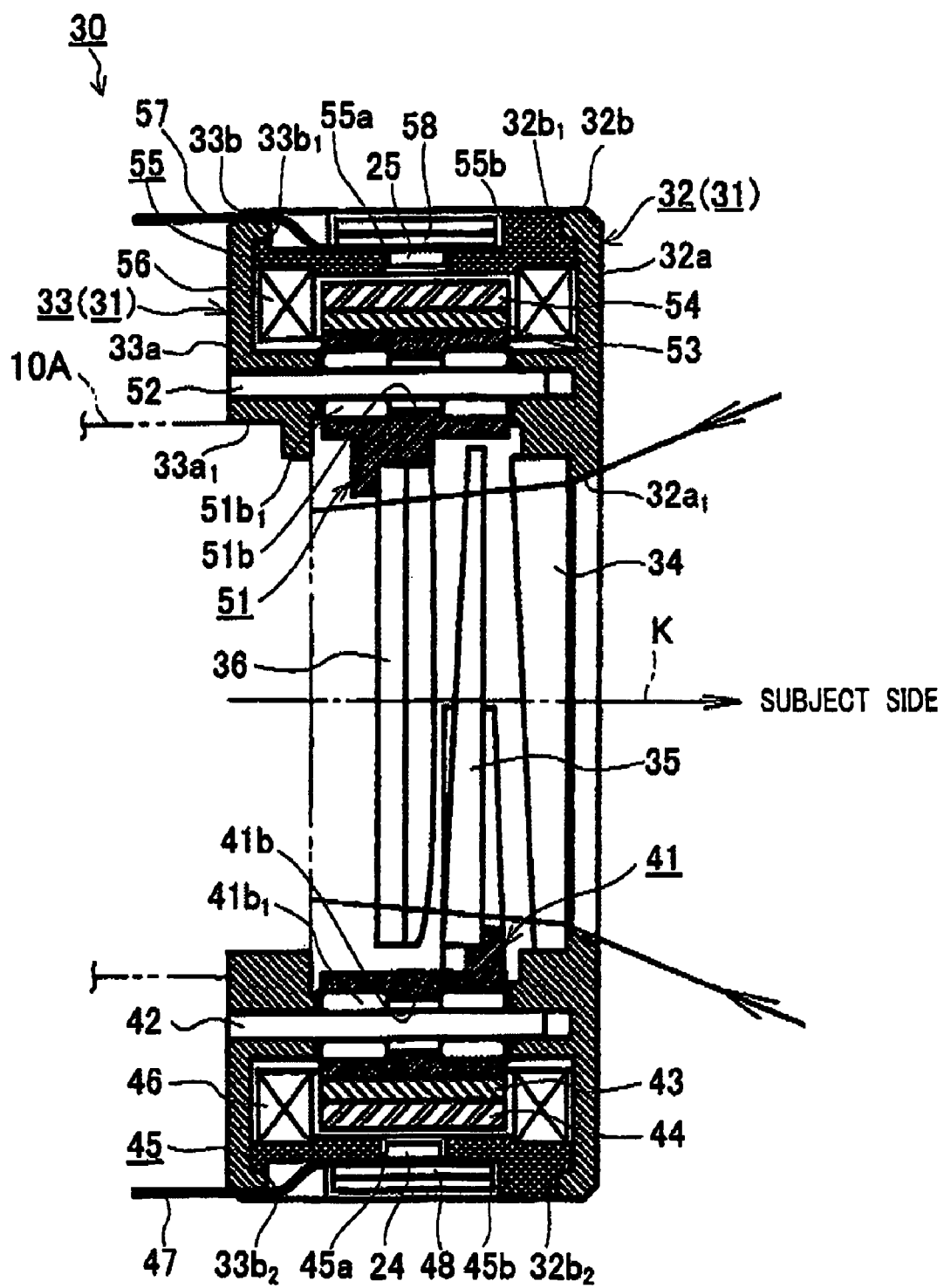
FIG. 5 is an enlarged vertical cross-sectional view of the image fluctuation correcting apparatus according to the first exemplary embodiment of the present invention.

Next, with reference to FIGS. 4 and 5, the detailed configuration of image fluctuation correcting apparatus 30 will be described below.

The frame body 31 is made with a black resin material and can be divided into the front frame body 32 and the rear frame body 33. The frame body 31 is formed by abutting an abutment surface of the front frame body 32 on one of the rear frame body 33 and integrally connecting the front frame body 32 to the rear frame body 33.

The front frame body 32 is formed in a cylindrical shape by a disk front face 32a and a cylindrical face 32b extending from a peripheral edge of the disk front face 32a. The front frame body 32 opens at a rear face side of the cylindrical face 32b. The front frame body 32 has a rectangular slit 32a1 for passing light from a subject through the front face 32a to receive the light in the front frame body 32, at a center region of the front face 32a. The front fame body 32 further has notch portions 32b1 and 32b2 with predetermined widths at upper and lower portions of the cylindrical face 32b. The notch portion 32b1 is opposed to the notch portion 32b2. The front frame body 32 furthermore has claw engaged portions 32b3 and 32b4, which are formed in concave shapes on the cylindrical face 32b, at right and left portions of the cylindrical face 32b. Claw portions 33b3 and 33b4 of the rear frame body 33 are respectively engaged to the claw engaged portions 32b3 and 32b4.

The fixed apex angle prism 34 is fixed in the front frame body 32 so as to be opposed to the slit 32a1. The apex angle direction of fixed apex angle prism 34 is set to always point to a lower oblique left (e.g. −45 degree angle direction) of the frame body 31 as viewed from the subject side.

The rear frame body 33 is formed in a cylindrical shape with step by a disk rear face 33a, a cylindrical face 33b extending from a peripheral edge of the disk rear face 33a and having the same diameter as the cylindrical face 32b of the front frame body 32, and a small diameter cylindrical face 33c extending from an inner peripheral edge of the cylindrical face 33b and having a slightly smaller diameter than the cylindrical face 33b. The rear frame body 33 opens at a front face side of the small diameter cylindrical face 33c. The rear frame body 33 has a circular slit 33a1 for passing light from a subject through the rear face 33a at a center region of the rear face 33a. The rear fame body 33 further has notch portions 33b1 and 33b2 with predetermined widths at upper and lower portions of the cylindrical face 33b. The notch portion 33b1 is opposed to the notch portion 33b2. The rear frame body 33 furthermore has the claw portions 33b3 and 33b4, which protrude toward the claw engaged portions 32b3 and 32b4 of the front frame body 32, at right and left portions of the cylindrical face 33b.

In a situation where the notch portions 32b1 and 32b2 of the front frame body 32 are respectively opposed to the notch portions 33b1 and 33b2 of the rear frame body 33, the claw portions 33b3 and 33b4 of the rear frame body 33 are respectively engaged to the claw engaged portions 32b3 and 32b4 while the small diameter cylindrical face 33c of the rear frame body 33 is fitted to an inner side of the cylindrical face 32b of the front frame body 32. Thereby, the front frame body 32 is connected to the rear frame body 33.

The first shaft 42 is laterally installed on an inner side of the rear face 33a and is located above the notch portion 33b2. The first shaft 42 is set to be nearly parallel to the optical axis K when the image fluctuation correcting apparatus 30 is arranged in the video camera 10A. The first prism holding member 41 with the first rotary apex angle prism 35, which is opposed to the fixed apex angle prism 34, is arranged in the frame body 31 so as to be capable of rotating around the first shaft 42 within the predetermined angle range. As shown in FIG. 2C, the apex angle direction of the first rotary apex angle prism 35 is set to be parallel to the Y axis at the initial time when the image fluctuation correcting apparatus 30 is arranged in the video camera 10A.

The first prism holding member 41 is made with a black resin material and formed by the concave guard frame portion 41a and the shaft bush portion 41b. The concave guard frame portion 41a includes a lens attachment portion with a width corresponding to one of the first rotary apex angle prism 35 therein. The first rotary apex angle prism 35 is held with an adhesive agent in the lens attachment portion, at the lower end and right and left sides thereof. The shaft bush portion 41b is formed in a cylindrical shape and protrudes from a center region of the concave guard frame portion 41a so as to be perpendicular to the first rotary apex angle prism 35. The shaft bush portion 41b is rotatably attached to the first shaft 42 via two oil-less metals 41b1 fitted in the shaft bush portion 41b.

A first rotor yoke 43 is formed in a half cylindrical shape and fixed on a lower outer circumferential face of the shaft bush portion 41b with an adhesive agent. A first magnet 44 is further fixed on an outer circumferential face of the first rotor yoke 43 with an adhesive agent. The first magnet 44 is formed by sandwiching a magnetic gap portion 44c between an N pole 44a and an S pole 44b and then magnetizing an assembly of them in a thickness direction of the assembly.

A first isolated coil holder 45 is fixed to the frame body 31 so as to be sandwiched between the notch portions 32b2 and 33b2. A first drive coil 46, which is wound in a square shape, is fixed on the first isolated coil holder 45 with an adhesive agent. A leading line of the first drive coil 46 are soldered to a first flexible printed circuit board 47.

The first rotor yoke 43 and the first magnet 44 fixed on the lower outer circumferential face of the shaft bush portion 41b are inserted into a cavity portion surrounded by the first drive coil 46. In this configuration, the first drive coil 46 is wound to surround the first rotor yoke 43 and the first magnet 44.

The first angle sensor 24 using the hall element is soldered on the first flexible printed circuit board 47 to be opposed to a back side of the first isolated coil holder 45. Then, the first angle sensor 24 is inserted into a center square hole portion 45a which penetrates the first isolated coil holder 45 at a center region of the first isolated coil holder 45. In this configuration, the first angle sensor 24 is opposed to the magnetic gap portion 44c of the first magnet 44 away from each other.

A first back yoke 48 is fixed on a back face of the first flexible printed circuit board 47 with an adhesive agent. The first back yoke 48 is inserted and fit into an outer square hole portion 45b mounted on the back side of the first isolated coil holder 45.

Accordingly, a first electromagnetic actuator for rotating the first rotary apex angle prism 35 held in the first prism holding member 41 has the first rotor yoke 43 and the first magnet 44, which are fixed on the first prism holding member 41, and the first drive coil 46 and the first back yoke 48, which are fixed in the frame body 31.

The second shaft 52 is laterally installed on an inner side of the rear face 33a and is located below the notch portion 33b1. The second shaft 52 is nearly parallel to the first shaft 42 and located 180-degree angle away from the first shaft 42. The second shaft 52 is set to be nearly parallel to the optical axis K when the image fluctuation correcting apparatus 30 is arranged in the video camera 10A. The second prism holding member 51 with the second rotary apex angle prism 36, which is opposed to the first rotary apex angle prism 35, is arranged in the frame body 31 so as to be capable of rotating around the second shaft 52 within the predetermined angle range. As shown in FIG. 2C, the apex angle direction of the second rotary apex angle prism 36 is set to be parallel to the X axis at the initial time when the image fluctuation correcting apparatus 30 is arranged in the video camera 10A.

The second prism holding member 51 is made with a black resin material and formed by the concave guard frame portion 51a and the shaft bush portion 51b. The concave guard frame portion 51a includes a lens attachment portion with a width corresponding to one of the second rotary apex angle prism 36 therein. The second rotary apex angle prism 36 is held with an adhesive agent in the lens attachment portion, at the upper end and right and left sides thereof. The shaft bush portion 51b is formed in a cylindrical shape and protrudes from a center region of the concave guard frame portion 51a so as to be perpendicular to the second rotary apex angle prism 36. The shaft bush portion 51b is rotatably attached to the second shaft 52 via two oil-less metals 51b1 fitted in the shaft bush portion 51b.

A second rotor yoke 53 is formed in a half cylindrical shape and fixed on an upper outer circumferential face of the shaft bush portion 51b with an adhesive agent. A second magnet 54 is further fixed on an outer circumferential face of the second rotor yoke 53 with an adhesive agent. The second magnet 54 is formed by sandwiching a magnetic gap portion 54c between an N pole 54a and an S pole 54b and then magnetizing an assembly of them in a thickness direction of the assembly.

A second isolated coil holder 55 is fixed to the frame body 31 so as to be sandwiched between the notch portions 32b1 and 33b1. A second drive coil 56, which is wound in a square shape, is fixed on the second isolated coil holder 55 with an adhesive agent. A leading line of the second drive coil 56 are soldered to a second flexible printed circuit board 57.

The second rotor yoke 53 and the second magnet 54 fixed on the upper outer circumferential face of the shaft bush portion 51b are inserted into a cavity portion surrounded by the second drive coil 56. In this configuration, the second drive coil 56 is wound to surround the second rotor yoke 53 and the second magnet 54.

The second angle sensor 25 using the hall element is soldered on the second flexible printed circuit board 57 to be opposed to a back side of the second isolated coil holder 55. Then, the second angle sensor 25 is inserted into a center square hole portion 55a which penetrates the second isolated coil holder 55 at a center region of the second isolated coil holder 55. In this configuration, the second angle sensor 25 is opposed to the magnetic gap portion 54c of the second magnet 54 away from each other.

A second back yoke 58 is fixed on a back face of the second flexible printed circuit board 57 with an adhesive agent. The second back yoke 58 is inserted and fit into an outer square hole portion 55b mounted on the back side of the second isolated coil holder 55.

In this configuration, the first and second flexible printed circuit boards 47 and 57 to which the first and second drive coils 46 and 56 are soldered extend outward on the rear frame body 33. Since the first and second flexible printed circuit boards 47 and 57 are not displaced, the leading lines are not broken.

Accordingly, a second electromagnetic actuator for rotating the second rotary apex angle prism 36 held in the second prism holding member 51 has the second rotor yoke 53 and the second magnet 54, which are fixed on the second prism holding member 51, and the second drive coil 56 and the second back yoke 58, which are fixed in the frame body 31.

The image fluctuation correcting apparatus 30 certainly ensure that the shaft bush portions 41b and 51b have wide spans because the first and second prism holding members 41 and 51 are rotatably supported by the first and second shafts 42 and 52 which are located 180-degree angle away from each other. This reduces variations of rotation angles of the first and second rotary apex angle prisms 35 and 36. The image fluctuation correcting apparatus 30 also reduces influence of magnetism generated by one electromagnetic actuator spanning one generated by another electromagnetic actuator because the first electromagnetic actuator is arranged 180-degree angle away from the second electromagnetic actuator. This can easily arrange magnetic circuits for driving around rotation centers of the first and second rotary apex angle prisms 35 and 36 and realize a cost reduction due to downsizing the first and second magnets 44 and 54, which leads to a simple and small structure of the image fluctuation correcting apparatus 30.

Next, with reference to FIGS. 6 and 7, in the image fluctuation correcting apparatus 30, operation for rotating the first and second rotary apex angle prisms 35 and 36 and operation for detecting rotation positions of the first and second rotary apex angle prisms 35 and 36 will be described below.

As shown in FIG. 6, the first prism holding member 41 in which the first rotary apex angle prism 35 is held and the second prism holding members 51 in which the second rotary apex angle prism 36 is held are rotatably supported by the first and second shafts 42 and 52 which are located 180-degree angle away from each other. It is noted that the first and second rotary apex angle prisms 35 and 36 are respectively arranged at front and rear sides of the frame body 31.

In this configuration, the first shaft 42 is rotatably fitted into the oil-less metals 41b1 inserted in the shaft bush portion 41b of the first prism holding member 41 in which the first rotary apex angle prism 35 is held, and the first rotor yoke 43 and the first magnet 44 fixed the lower outer circumferential face of the shaft bush portion 41b are located in the cavity portion surrounded by the first drive coil 46.

In the reference position at the initial time when the first rotary apex angle prism 35 does not rotate, the image fluctuation correcting apparatus 30 does not flow electric current in the first drive coil 46. This does not induce a magnetic field around the first drive coil 46. Therefore, the first prism holding member 41 does not rotate around the first shaft 41 and slant with respect to the Y axis because a magnetic loop generated by the first rotary yoke 43, the first magnet 44 and the first back yoke 48 is not disturbed. This means that the image fluctuation correcting apparatus 30 does not carry out image fluctuation correcting operation. That is, in the case where the image fluctuation correcting apparatus 30 does not flow electric current in the first drive coil 46 in order not to carry out image fluctuation correcting operation in the reference position at the initial time when the first rotary apex angle prism 35 does not rotate, bias force acts to the first drive coil 46 so that a flux content of the N pole 44a is about the same as one of the s pole 44b, while a magnetic filed is generated by the first rotary yoke 43, the first magnet 44 and the first back yoke 48. This keeps the first rotary apex angle prism 35 at a center position α0 of the predetermined angle range ±α1 without being affected by a capture position of video camera 10A at the initial time because the first prism holding member 41 keeps the center position α0 so as to be opposed to a center portion of the magnetic gap portion 44c.

When the image fluctuation correcting apparatus 30 flows electric current in the first drive coil 46 in a counterclockwise direction of the first drive coil 46 as viewed from upside, a magnetic field is induced in the cavity portion surrounded by the first drive coil 46 upwards. The induced magnetic field acts to the magnetic loop to rotate the first prism holding member 41 around the first shaft 41 in −α direction shown in FIG. 6 (−X side shown in FIG. 2C). This means that the image fluctuation correcting apparatus 30 carries out image fluctuation correcting operation.

On the other hand, when the image fluctuation correcting apparatus 30 flows electric current in the first drive coil 46 in a clockwise direction of the first drive coil 46 as viewed from upside, a magnetic field is induced in the cavity portion surrounded by the first drive coil 46 downwards. The induced magnetic field acts to the magnetic loop to rotate the first prism holding member 41 around the first shaft 41 in +α direction shown in FIG. 6 (+X side shown in FIG. 2C). This means that the image fluctuation correcting apparatus 30 carries out image fluctuation correcting operation.

That is, when the image fluctuation correcting apparatus 30 flows in the first drive coil 46 electric current for rotating the first rotary apex angle prism 35 in a direction for canceling the horizontal fluctuation of captured image in order to carry out image fluctuation correcting operation according to the amount of horizontal fluctuation of captured image with respect to the first rotary apex angle prism 35, the first prism holding member 41 is drawn toward a side of the N pole 44a (or the S pole 44b) by electromagnetic force generated between the first drive coil 46 and the N pole 44a (or the S pole 44b). This rotates the first prism holding member 41 by desired degrees around the first shaft 42 according to the horizontal fluctuation of captured image.

The first angle sensor 24 is opposed to the magnetic gap portion 44c with gap width, which is formed on a center portion of the first magnetic 44 and separates the N pole 44a from the S pole 44b, in the reference position at the initial time when the first rotary apex angle prism 35 does not rotate. The first angle sensor 24 generates an output value (e.g. voltage value) based on magnitude of magnetic flux density detected thereby.

The gap width of magnetic gap portion 44c is set so that the output value from the first angle sensor 24 linearly increases from a maximum rotation angle +α1 (+X side) to a minimum rotation angle +α1 (−X side) of the first rotary apex angle prism 35 as shown in FIG. 7. In the reference position at the initial time when the first rotary apex angle prism 35 does not rotate, the output value from the first angle sensor 24 represents that magnetic flux density is zero. Therefore, the control unit 21 can precisely detect a rotation angle of the first rotary apex angle prism 35 based on the output value from the first angle sensor 24.

As well, the second shaft 52 is rotatably fitted into the oil-less metals 51b1 inserted in the shaft bush portion 51b of the second prism holding member 51 in which the second rotary apex angle prism 36 is held, and the second rotor yoke 53 and the second magnet 54 fixed the lower outer circumferential face of the shaft bush portion 51b are located in the cavity portion surrounded by the second drive coil 56.

In the reference position at the initial time when the second rotary apex angle prism 36 does not rotate, the image fluctuation correcting apparatus 30 does not flow electric current in the second drive coil 56. This does not induce a magnetic field around the second drive coil 56. Therefore, the second prism holding member 51 does not rotate around the second shaft 42 and slant with respect to the Y axis because a magnetic loop generated by the second rotary yoke 53, the second magnet 54 and the second back yoke 58 is not disturbed. This means that the image fluctuation correcting apparatus 30 does not carry out image fluctuation correcting operation. That is, in the case where the image fluctuation correcting apparatus 30 does not flow electric current in the second drive coil 56 in order not to carry out image fluctuation correcting operation in the reference position at the initial time when the second rotary apex angle prism 36 does not rotate, bias force acts to the second drive coil 56 so that a flux content of the N pole 54a is about the same as one of the s pole 54b, while a magnetic filed is generated by the second rotary yoke 53, the second magnet 54 and the second back yoke 58. This keeps the second rotary apex angle prism 36 at a center position $\alpha 0$ of the predetermined angle range $\pm \alpha 2$ without being affected by a capture position of video camera 10A at the initial time because the second prism holding member 51 keeps the center position $\alpha 0$ so as to be opposed to a center portion of the magnetic gap portion 54c.

When the image fluctuation correcting apparatus 30 flows electric current in the second drive coil 56 in a counterclockwise direction of the second drive coil 56 as viewed from downside, a magnetic field is induced in the cavity portion surrounded by the second drive coil 46 downwards. The induced magnetic field acts to the magnetic loop to rotate the second prism holding member 51 around the second shaft 42 in $-\alpha$ direction shown in FIG. 6 ($-X$ side shown in FIG. 2C). This means that the image fluctuation correcting apparatus 30 carries out image fluctuation correcting operation.

On the other hand, when the image fluctuation correcting apparatus 30 flows electric current in the second drive coil 56 in a clockwise direction of the second drive coil 46 as viewed from downside, a magnetic field is induced in the cavity portion surrounded by the second drive coil 46 upwards. The induced magnetic field acts to the magnetic loop to rotate the second prism holding member 51 around the second shaft 42 in $+\alpha$ direction shown in FIG. 6 ($+X$ side shown in FIG. 2C). This means that the image fluctuation correcting apparatus 30 carries out image fluctuation correcting operation.

That is, when the image fluctuation correcting apparatus 30 flows in the second drive coil 56 electric current for rotating the second rotary apex angle prism 36 in a direction for canceling the vertical fluctuation of captured image in order to carry out image fluctuation correcting operation according to the amount of vertical fluctuation of captured image with respect to the second rotary apex angle prism 36, the second prism holding member 51 is drawn toward a side of the N pole 54a (or the S pole 54b) by electromagnetic force generated between the second drive coil 56 and the N pole 54a (or the S pole 54b). This rotates the second prism holding member 51 by desired degrees around the second shaft 52 according to the vertical fluctuation of captured image.

The second angle sensor 25 is opposed to the magnetic gap portion 54c with gap width, which is formed on a center portion of the second magnet 54 and separates the N pole 54a from the S pole 54b, in the reference position at the initial time when the second rotary apex angle prism 36 does not rotate. The second angle sensor 25 generates an output value (e.g. voltage value) based on magnitude of magnetic flux density detected thereby.

The gap width of magnetic gap portion 54c is set so that the output value from the second angle sensor 25 linearly increases from a maximum rotation angle $+\alpha 2$ ($+X$ side) to a minimum rotation angle $-\alpha 2$ ($-X$ side) of the second rotary apex angle prism 36 as shown in FIG. 7. In the reference position at the initial time when the second rotary apex angle prism 36 does not rotate, the output value from the second angle sensor 25 represents that magnetic flux density is zero. Therefore, the control unit 21 can precisely detect a rotation angle of the second rotary apex angle prism 36 based on the output value from the second angle sensor 25.

In the present embodiment, although the maximum and minimum rotation angles $+\alpha 1$ and $-\alpha 1$ of the first rotary apex angle prism 35 have the same values as the maximum and minimum rotation angles $+\alpha 2$ and $-\alpha 2$ of the second rotary apex angle prism 36, the maximum and minimum rotation angles $+\alpha 1$ and $-\alpha 1$ of the first rotary apex angle prism 35 may have different values from the maximum and minimum rotation angles $+\alpha 2$ and $-\alpha 2$ of the second rotary apex angle prism 36.

The advantageous feature of the image fluctuation correcting apparatus 30 will be described below.

Even if the video camera 10A vibrates in a vertical direction and/or a horizontal direction thereof, the image fluctuation correcting apparatus 30 can easily cancel a vertical fluctuation and/or a horizontal fluctuation of the image A of subject because the control unit 21 flows electric current in the first drive coil 46 and/or the second drive coil 56 via the rotary apex angle prism drive circuit 26 to rotate the first rotary apex angle prism 35 and/or the second rotary apex angle prism 36 in a desired direction(s). This realizes that a good image A of subject is obtained.

Second Exemplary Embodiment

An image fluctuation correcting apparatus 60 according to a second exemplary embodiment of the present invention will be described below in detail, with reference to FIGS. 8 to 12. If members of the image fluctuation correcting apparatus 60 are the same as those of the image fluctuation correcting apparatus 30, the same numbers as those of the image fluctuation correcting apparatus 30 are assigned to the members of the image fluctuation correcting apparatus 60. If members of the image fluctuation correcting apparatus 60 are different from those of the image fluctuation correcting apparatus 30, new numbers are assigned to the members of the image fluctuation correcting apparatus 60.

Figure 8:
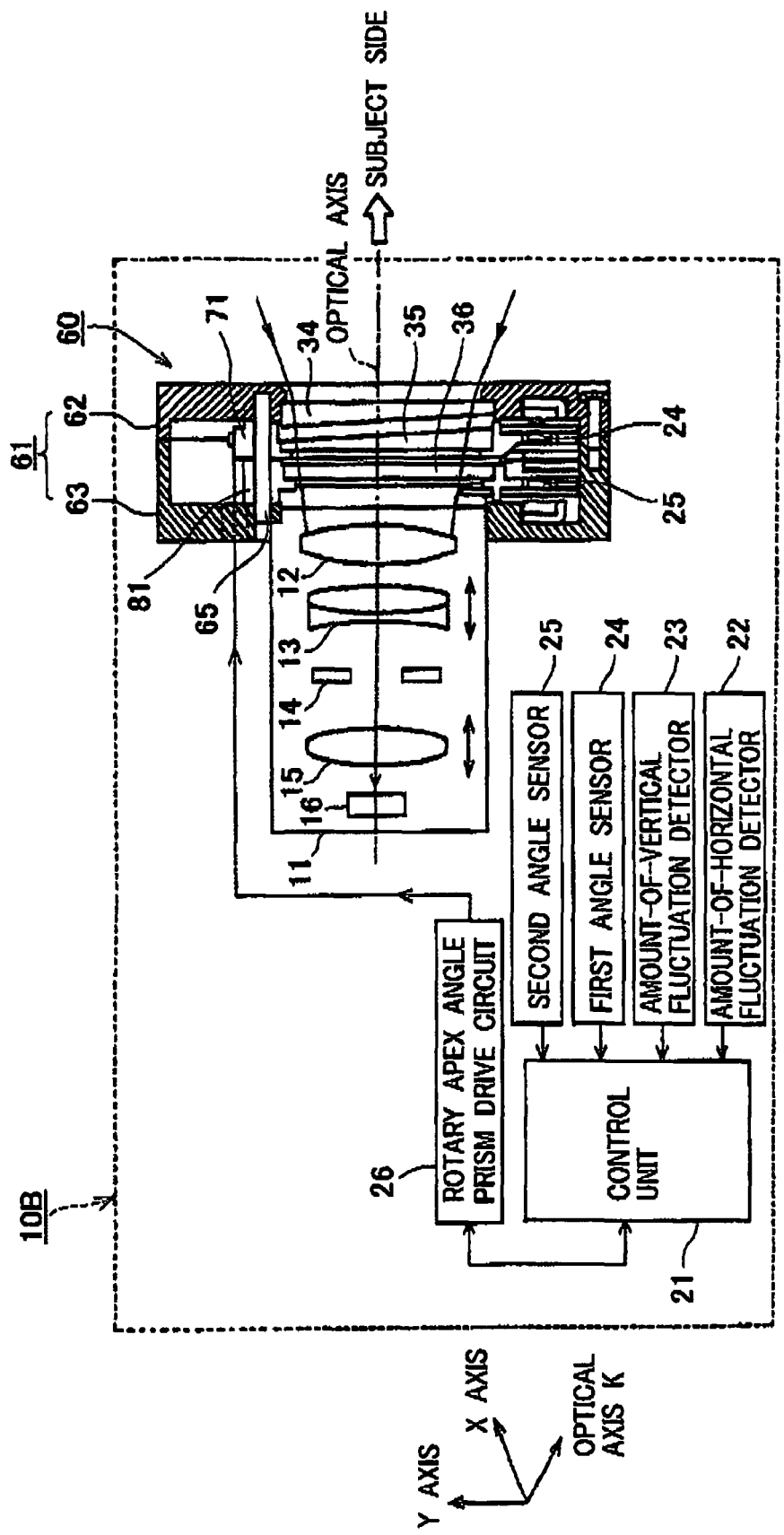
FIG. 8 is a configuration diagram of a video camera to which an image fluctuation correcting apparatus is applied, according to a second exemplary embodiment of the present invention.

As shown in FIG. 8, a video camera 10B includes therein the image fluctuation correcting apparatus 60 mounted to a front region of a lens tube 11. In the image fluctuation correcting apparatus 60, a frame body 61 can be divided into a front frame body 62 and a rear frame body 63. The front frame body 62 abuts on the rear frame body 63 and integrally connected to the rear frame body 63, which forms the frame body 61. In the frame body 61, a fixed apex angle prism 34, a first rotary apex angle prism 35 and a second rotary apex angle prism 36 are arranged in this order from a front side (subject side) of the lens tube 11. The fixed apex angle prism 34 is fixed to the front side of the lens tube 11. The first rotary apex angle prism 35 rotates (pivots) together with a first prism holding member 71 around a shaft 65, which is substantially parallel to an optical axis K, within a predetermined angle range and along a plane nearly perpendicular to the optical axis K, by means of electromagnetic force, according to an amount of horizontal fluctuation (or vertical fluctuation) of the video camera 10B. The second rotary apex angle prism 36 rotates (pivots) together with a second prism holding member 81 around the shaft 65 within a predetermined angle range and along a plane nearly perpendicular to the optical axis K, by means of electromagnetic force, according to an amount of vertical fluctuation (or horizontal fluctuation) of the video camera 10B.

As shown in FIGS. 2A to 2C, apex angle directions of the fixed apex angle prism 34, the first rotary apex angle prism 35 and the second rotary apex angle prism 36 are set as well as the first exemplary embodiment.

In this configuration, the image fluctuation correcting apparatus 60 may rotate one of the first and second rotary apex angle prisms 35 and 36 according to the amount of horizontal fluctuation of the video camera 10B, and rotate the other of the first and second rotary apex angle prisms 35 and 36 according to the amount of vertical fluctuation of the video camera 10B. In this exemplary embodiment, the image fluctuation correcting apparatus 60 rotates the first rotary apex angle prism 35 according to the amount of horizontal fluctuation of the video camera 10B, and rotates the second rotary apex angle prism 36 according to the amount of vertical fluctuation of the video camera 10B.

In the lens tube 11, a front lens (or a front lens group) 12, a variable power lens (or a variable power lens group) 13, an iris 14, a focus lens (or a focus lens group) 15 and an image pickup element 16 that carries out a photoelectric convert with respect to a subject image are arranged in this order from the subject side of the lens tube 11. In this configuration, the optical axis K of the image fluctuation correcting apparatus 60 is identical to that of each lens (or element) in the lens tube 11.

In the video camera 10B, a control unit 21, an amount-of-horizontal fluctuation detector 22, an amount-of-vertical fluctuation detector 23, a first angle sensor 24, a second angle sensor 25 and a rotary apex angle prism drive circuit 26 are mounted. The control unit 21 controls the whole of video camera 10B. The amount-of-horizontal fluctuation detector 22 detects an amount of horizontal fluctuation of the video camera 10B when the video camera 10B vibrates in a lateral direction with respect to Y axis perpendicular to the optical axis K. The amount-of-vertical fluctuation detector 23 detects an amount of vertical fluctuation of the video camera 10B when the video camera 10B vibrates in a longitudinal direction with respect to X axis perpendicular to the optical axis K and the Y axis. The first angle sensor 24 detects a rotation angle of the first rotary apex angle prism 35 rotating according to the amount of horizontal fluctuation of the video camera 10B. The second angle sensor 25 detects a rotation angle of the second rotary apex angle prism 36 rotating according to the amount of vertical fluctuation of the video camera 10B. The rotary apex angle prism drive circuit 26 rotates the first rotary apex angel prism 35 and/or the second rotary apex angle prism 36 within the predetermined angel range(s).

The image fluctuation correcting apparatus 60 rotates the first and second apex angle prisms 35 and 36 based on a principle of polarization of luminous flux, as well as the first exemplary embodiment.

The configuration of image fluctuation correcting apparatus 60 mainly differs from that of image fluctuation correcting apparatus 30 in the following respect. The first prism holding member 71 holding the first rotary apex angle prism 35 and the second prism holding member 81 holding the second rotary apex angle prism 36 rotate around the shaft 65 which is substantially parallel to the optical axis K and laterally installed on an upper peripheral portion of the frame body 61 and between the front frame body 62 and the rear frame body 63.

Figure 9:
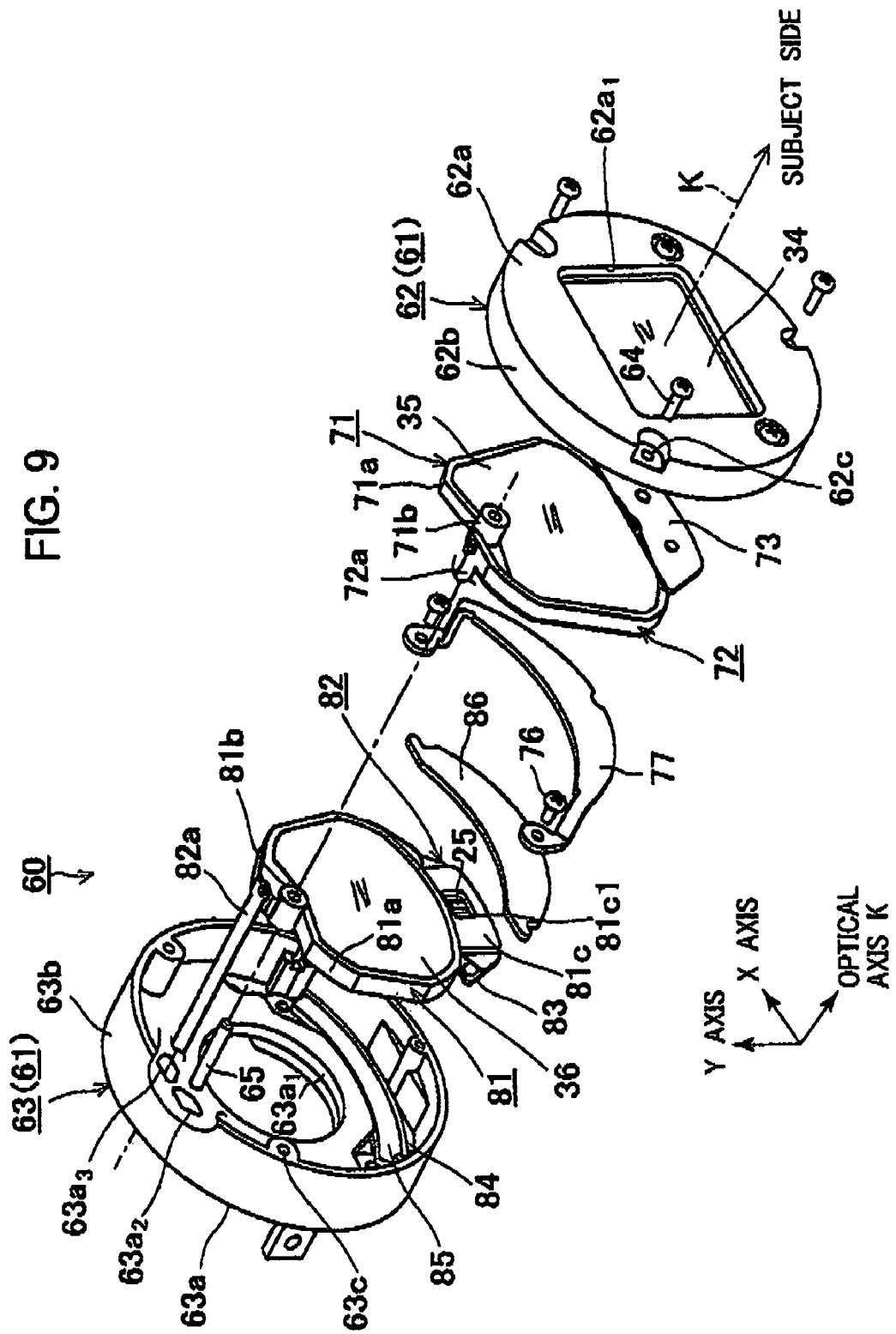
FIG. 9 is a first exploded perspective view of the image fluctuation correcting apparatus, which is viewed from a front side to a rear side thereof, according to the second exemplary embodiment of the present invention.
Figure 10:
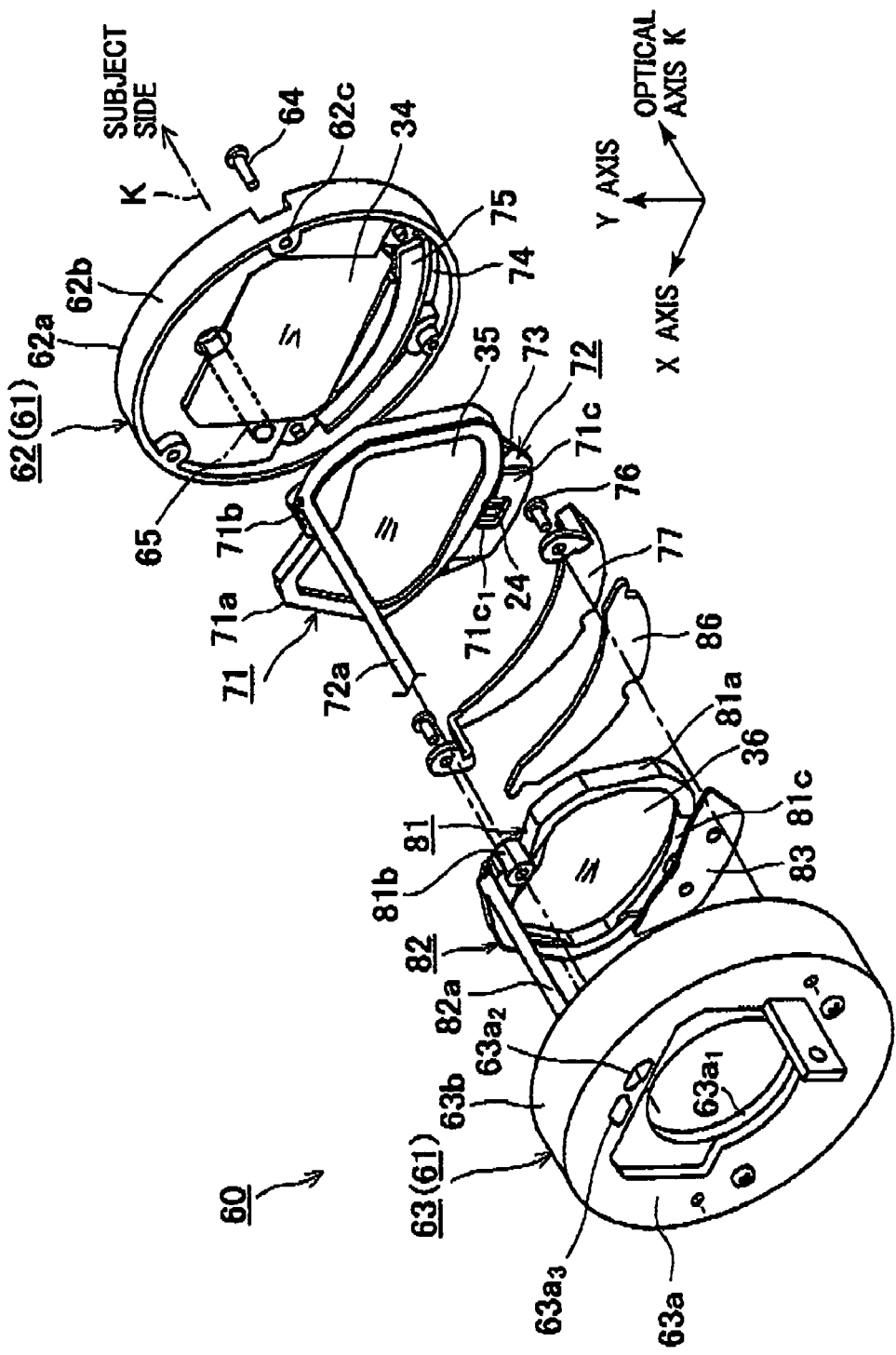
FIG. 10 is a second exploded perspective view of the image fluctuation correcting apparatus, which is viewed from the rear side to the front side thereof, according to the second exemplary embodiment of the present invention.
Figure 11:
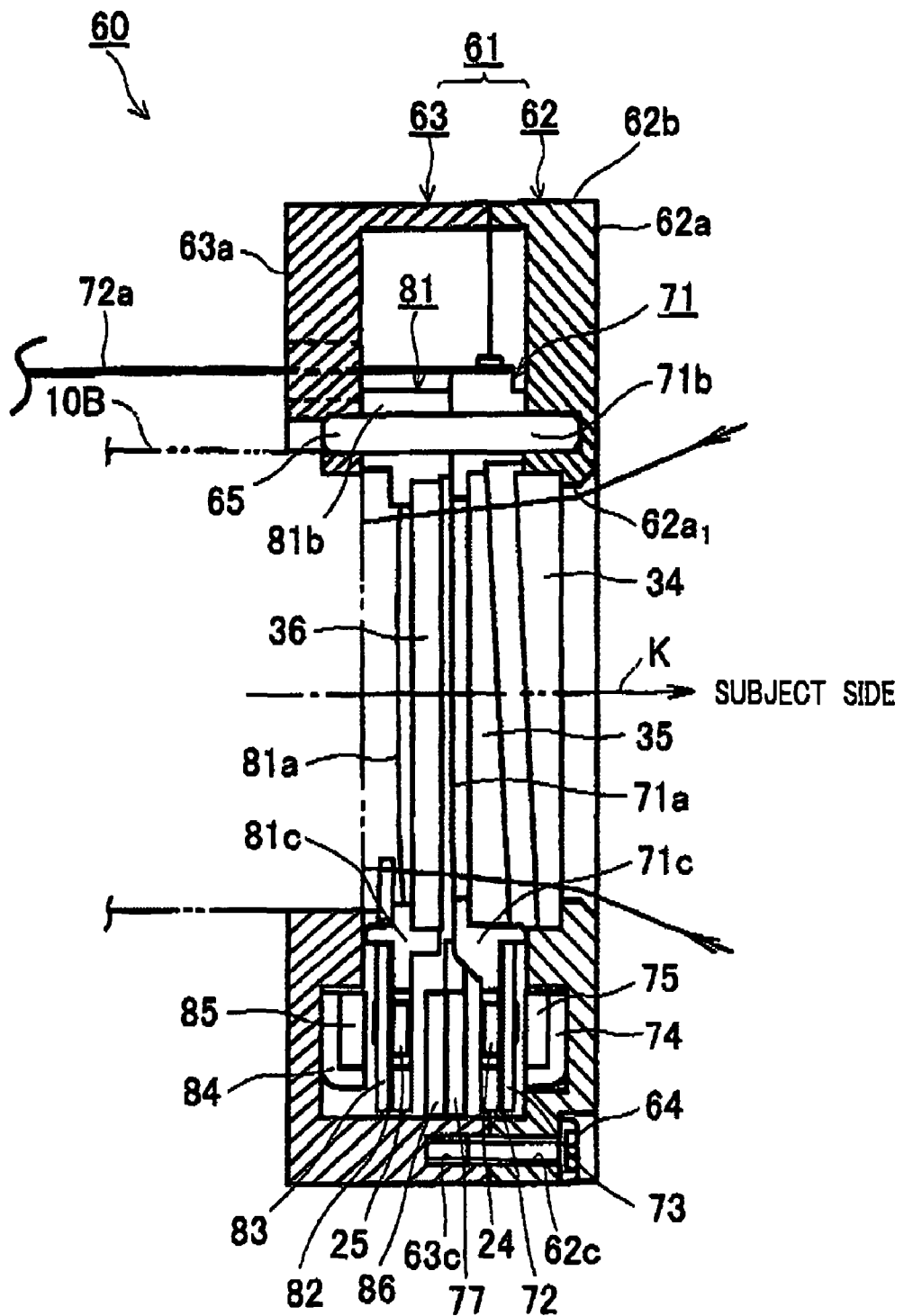
FIG. 11 is an enlarged vertical cross-sectional view of the image fluctuation correcting apparatus according to the second exemplary embodiment of the present invention.

Next, with reference to FIGS. 9 to 11, the detailed configuration of image fluctuation correcting apparatus 60 will be described below.

The frame body 61 is made with a black resin material and can be divided into the front frame body 62 and the rear frame body 63. The frame body 61 is formed by abutting an abutment surface of the front frame body 62 on one of the rear frame body 63 and integrally connected the front frame body 62 to the rear frame body 63 using three screws 64.

The front frame body 62 is formed in a cylindrical shape by a disk front face 62a, and a cylindrical face 62b extending from a peripheral edge of the disk front face 62a. The front frame body 62 opens at a rear face side of the cylindrical face 62b. The front frame body 62 has a rectangulars lit 62a1 for passing light from a subject through the front face 62a to receive the light in the front frame body 62, at a center region of the front face 62a. The front frame body 62 further has three circular holes 62c in which three screws 64 are to be screwed along an outer circumference thereof. The fixed apex angle prism 34 is fixed in the front frame body 62 so as to be opposed to the slit 62a1. The apex angle direction of fixed apex angle prism 34 is set to always point to a lower oblique left (e.g. −45 degree angle direction) of the frame body 61 as viewed from the subject side.

The rear frame body 63 is formed in a cylindrical shape by a disk rear face 63a, and a cylindrical face 63b extending from a peripheral edge of the disk rear face 63a and having the same diameter as the cylindrical face 62b of the front frame body 62. The rear frame body 63 opens at a front face side of the cylindrical face 63b. The rear frame body 63 has a circular slit 63a1 for passing light from a subject through the rear face 63a at a center region of the rear face 63a. The rear frame body 63 further has holes 63a2 and 63a3 through which extending portions 72a and 82a of first and second flexible printed circuit boards 72 and 82 are drawn outside at an upper portion thereof. The front frame body 62 furthermore has three circular holes 62c in which three screws 64 are to be screwed along an outer circumference thereof.

The shaft 65 is substantially parallel to the optical axis K and laterally installed on an upper peripheral region in the frame body 61.

The first prism holding member 71 with the first rotary apex angle prism 35, which is opposed to the fixed apex angle prism 34, is arranged in the front frame body 62 so as to be capable of rotating around the shaft 65 within the predetermined angle range. As shown in FIG. 2C, the apex angle direction of the first rotary apex angle prism 35 is set to be parallel to the Y axis at the initial time when the image fluctuation correcting apparatus 60 is arranged in the video camera 10B.

The first prism holding member 71 is made with a black resin material and formed by a trapezoidal frame portion 71a, a tubular shaft bush portion 71b and a member attachment portion 71c. The trapezoidal frame portion 71a includes a lens attachment portion with a width corresponding to one of the first rotary apex angle prism 35 therein. The first rotary apex angle prism 35 is held with an adhesive agent in the lens attachment portion at an outer peripheral region thereof. The tubular shaft bush portion 71b is a cylindrical shape and protrudes above from an upper center region of the trapezoidal frame portion 71a so as to be perpendicular to the first rotary apex angle prism 35. The tubular shaft bush portion 71b is rotatably attached to the shaft 65. The member attachment portion 71c protrudes below from a lower center region of the trapezoidal frame portion 71a.

A first flexible printed circuit board 72 and a first printed circuit drive coil board 73 make a layer and are attached to the member attachment portion 71c at a front face side of the member attachment portion 71c. A first angle sensor 24 using a hall element is soldered on the first flexible printed circuit board 72. The first printed circuit drive coil board 73 is soldered on the first flexible printed circuit board 72. A first drive coil (not shown) is wound in the first printed circuit drive coil board 73.

The first drive coil is opposed to a first magnet 75 formed by being magnetized into an N pole and an S pole and attached to a lower region inside the front frame body 62 via a L-letter shaped first yoke 74 away from each other.

The first angle sensor 24 is arranged in a square hole 71c1 formed in a center region of the member attachment portion 71c and is opposed to a first back yoke 77 fixed to a lower region inside the rear frame body 63 using screws 76 and 76. The first back yoke 77 is fixed in the frame body 61 so as to be opposed to the first yoke 74 via the first flexible printed circuit board 72 and the first printed circuit drive coil board 73.

The extending portion 72a has a part with narrow width and is attached to the trapezoidal frame portion 71a along a side face of the trapezoidal frame portion 71a. The extending portion 72a extends from the vicinity of the tubular shaft bush portion 71b toward a rear side so as to be in substantially parallel to the optical axis K, and then is drawn outside through the hole 63a2 which is formed on the upper portion of the rear face 63a of the rear frame body 63. In this configuration, the extending portion 72a does not fluctuate in the vicinity of the shaft 65 and a load is not applied to the extending portion 72a when the first prism holding member 71 rotates.

Accordingly, a first electromagnetic actuator for rotating the first rotary apex angle prism 35 held in the first prism holding member 71 has the first yoke 74, the first magnet 75, which are fixed to the lower region inside the front frame body 62, the first printed circuit drive coil board 73, which has the first drive coil fixed to the member attachment portion 71c of the first prism holding member 71, and the first back yoke 77, which is fixed to the lower region inside the rear frame body 63.

As well, the second prism holding member 81 with the second rotary apex angle prism 36, which is opposed to the first rotary apex angle prism 35, is arranged in the rear frame body 63 so as to be capable of rotating around the shaft 65 within the predetermined angle range. As shown in FIG. 2C, the apex angle direction of the second rotary apex angle prism 36 is set to be parallel to the X axis at the initial time when the image fluctuation correcting apparatus 60 is arranged in the video camera 10B.

The second prism holding member 81 is made with a black resin material and formed by a trapezoidal frame portion 81a, a tubular shaft bush portion 81b and a member attachment portion 81c. The trapezoidal frame portion 81a includes a lens attachment portion with a width corresponding to one of the second rotary apex angle prism 36 therein. The second rotary apex angle prism 36 is held with an adhesive agent in the lens attachment portion at an outer peripheral region thereof. The tubular shaft bush portion 81b is a cylindrical shape and protrudes above from an upper center region of the trapezoidal frame portion 81a so as to be perpendicular to the second rotary apex angle prism 36. The tubular shaft bush portion 81b is rotatably attached to the shaft 65. The member attachment portion 81c protrudes below from a lower center region of the trapezoidal frame portion 81a.

A second flexible printed circuit board 82 and a second printed circuit drive coil board 83 make a layer and are attached to the member attachment portion 81c at a rear face side of the member attachment portion 81c. A second angle sensor 25 using a hall element is soldered on the second flexible printed circuit board 82. The second printed circuit drive coil board 83 is soldered on the second flexible printed circuit board 82. A second drive coil (not shown) is wound in the second printed circuit drive coil board 83.

The second drive coil is opposed to a second magnet 85 formed by being magnetized into an N pole and an S pole and attached to a lower region inside the rear frame body 63 via a L-letter shaped second yoke 84 away from each other.

The second angle sensor 25 is arranged in a square hole 81c1 formed in a center region of the member attachment portion 81c and is opposed to a second back yoke 86 fitted to the first back yoke 77 which is fixed to the lower region inside the rear frame body 63 using the screws 76 and 76. The second back yoke 86 is fixed in the frame body 61 so as to be opposed to the second yoke 84 via the second flexible printed circuit board 82 and the second printed circuit drive coil board 83.

The extending portion 82a has a part with narrow width and is attached to the trapezoidal frame portion 81a along a side face of the trapezoidal frame portion 81a. The extending portion 82a extends from the vicinity of the tubular shaft bush portion 81b toward a rear side so as to be in substantially parallel to the optical axis K, and then is drawn outside through the hole 63a3 which is formed on the upper portion of the rear face 63a of the rear frame body 63. In this configuration, the extending portion 82a does not fluctuate in the vicinity of the shaft 65 and a load is not applied to the extending portion 82a when the second prism holding member 81 rotates.

The first flexible printed circuit board 72 and the first printed circuit drive coil board 73 are attached to the member attachment portion 71c of the first prism holding member 71 and the second flexible printed circuit board 82 and the second printed circuit drive coil board 83 are attached to the member attachment portion 81c of the second prism holding member 81. This allows the size of the image fluctuation correcting apparatus 60 to be smaller than that of the image fluctuation correcting apparatus 30.

Accordingly, a second electromagnetic actuator for rotating the second rotary apex angle prism 36 held in the second prism holding member 81 has the second yoke 84, the second magnet 85, which are fixed to the lower region inside the rear frame body 63, the second printed circuit drive coil board 83, which has the second drive coil fixed to the member attachment portion 81c of the second prism holding member 81, and the second back yoke 86, which is fixed to the lower region inside the rear frame body 63 via the first back yoke 77.

In the image fluctuation correcting apparatus 60, the first prism holding member 71 holding the first rotary apex angle prism 35 and the second prism holding member 81 holding the second rotary apex angle prism 36 are rotatably supported by the shaft 65. This reduces the number of members in comparison with the image fluctuation correcting apparatus 30 because the shaft 65 is shared.

Figure 12:
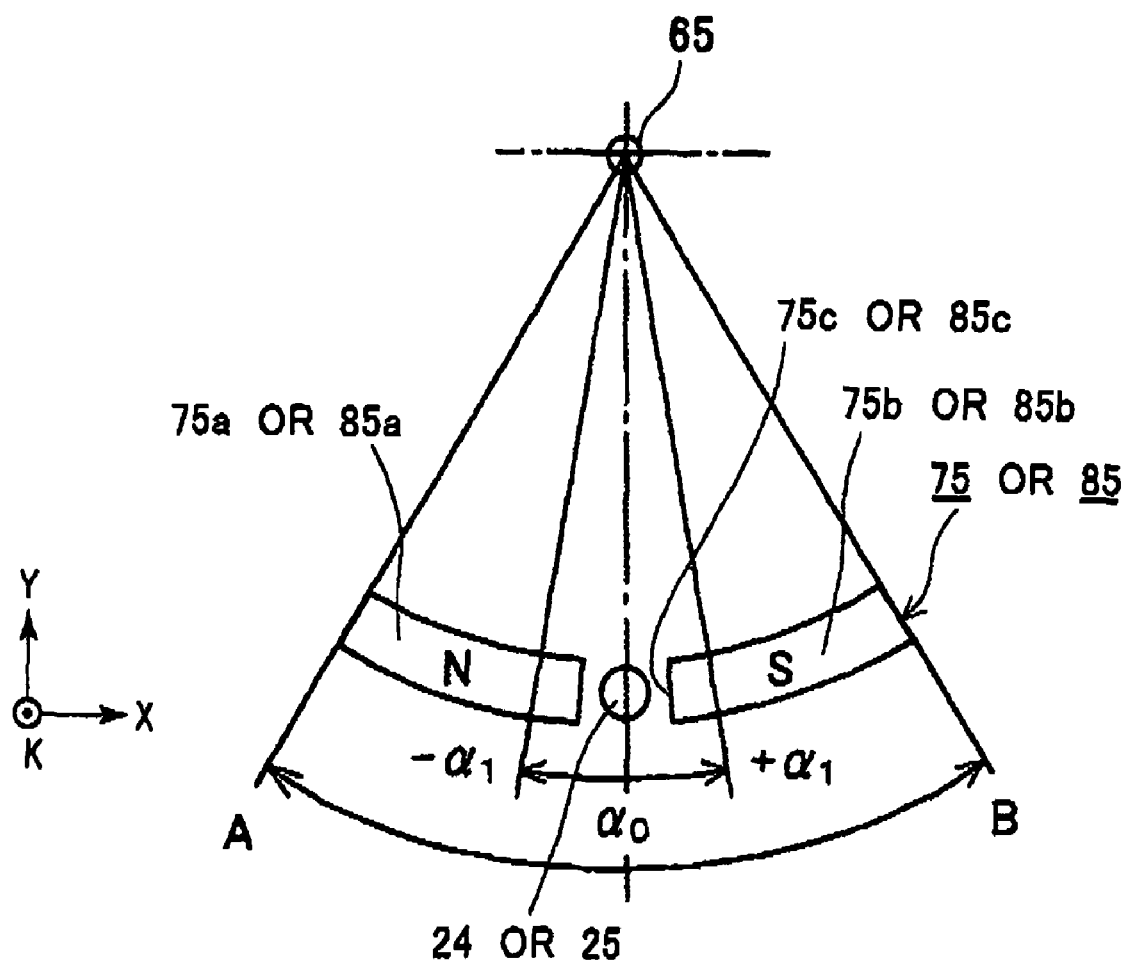
FIG. 12 is an explanatory diagram of operation for detecting rotating actions and rotation positions of first and second rotary apex angle prisms, in the image fluctuation correcting apparatus according to the second exemplary embodiment of the present invention.

Next, with reference to FIGS. 11 and 12, in the image fluctuation correcting apparatus 60, operation for rotating the first and second rotary apex angle prisms 35 and 36 and operation for detecting rotation positions of the first and second rotary apex angle prisms 35 and 36 will be described below.

In the reference position at the initial time when the first rotary apex angle prism 35 does not rotate, the image fluctuation correcting apparatus 60 does not flow electric current in the first drive coil. This does not induce a magnetic field around the first drive coil. Therefore, the first prism holding member 71 does not rotate around the shaft 65 and slant with respect to the Y axis because a magnetic loop generated by the first yoke 74, the first magnet 75 and the first back yoke 77 is not disturbed. This means that the image fluctuation correcting apparatus 60 does not carry out image fluctuation correcting operation. That is, in the case where the image fluctuation correcting apparatus 60 does not flow electric current in the first drive coil in order not to carry out image fluctuation correcting operation in the reference position at the initial time when the first rotary apex angle prism 35 does not rotate, bias force acts to the first drive coil so that a flux content of the N pole 75a is about the same as one of the s pole 75b, while a magnetic filed is generated by the first yoke 74, the first magnet 75 and the first back yoke 77. This keeps the first rotary apex angle prism 35 at a center position α0 of the predetermined angle range ±α1 without being affected by a capture position of video camera 10B at the initial time because the first prism holding member 71 keeps the center position α0 so as to be opposed to a center portion of the magnetic gap portion 75c.

Under a condition where the N pole 75a and the S pole 75b are respectively located at −X side and +X side in the first magnet 75, when the image fluctuation correcting apparatus 60 flows electric current in the first drive coil in a counter-clockwise direction of the first drive coil 46 as viewed from the subject side, a magnetic field is induced in a cavity portion surrounded by the first drive coil toward the subject side. The induced magnetic field affects the magnetic loop to rotate the first prism holding member 41 around the shaft 65 in −α direction shown in FIG. 12 (−X side shown in FIG. 2C). This means that the image fluctuation correcting apparatus 60 carries out image fluctuation correcting operation.

On the other hand, when the image fluctuation correcting apparatus 60 flows electric current in the first drive coil in a clockwise direction of the first drive coil as viewed from the subject side, a magnetic field is induced in the cavity portion surrounded by the first drive coil toward the back side. The induced magnetic field affects the magnetic loop to rotate the first prism holding member 71 around the shaft 65 in +α direction shown in FIG. 12 (+X side shown in FIG. 2C). This means that the image fluctuation correcting apparatus 60 carries out image fluctuation correcting operation.

That is, when the image fluctuation correcting apparatus 60 flows in the first drive coil electric current for rotating the first rotary apex angle prism 35 in a direction for canceling the horizontal fluctuation of captured image in order to carry out image fluctuation correcting operation according to the amount of horizontal fluctuation of captured image with respect to the first rotary apex angle prism 35, the first prism holding member 71 is drawn toward a side of the N pole 75a (or the S pole 75b) by electromagnetic force generated between the first drive coil and the N pole 75a (or the S pole 75b). This rotates the first prism holding member 71 by desired degrees around the shaft 65 according to the horizontal fluctuation of captured image.

The first angle sensor 24 is opposed to the magnetic gap portion 75c with gap width, which is formed on a center portion of the first magnetic 75 and separates the N pole 75a from the S pole 75b, in the reference position at the initial time when the first rotary apex angle prism 35 does not rotate. The first angle sensor 24 generates an output value (e.g. voltage value) based on magnitude of magnetic flux density detected thereby.

The gap width of magnetic gap portion 75c is set so that the output value from the first angle sensor 24 linearly increases from a maximum rotation angle +α1 (+X side) to a minimum rotation angle −α1 (−X side) of the first rotary apex angle prism 35 as shown in FIG. 7. In the reference position at the initial time when the first rotary apex angle prism 35 does not rotate, the output value from the first angle sensor 24 represents that magnetic flux density is zero. Therefore, the control unit 21 can precisely detect a rotation angle of the first rotary apex angle prism 35 based on the output value from the first angle sensor 24.

In the reference position at the initial time when the second rotary apex angle prism 36 does not rotate, the image fluctuation correcting apparatus 60 does not flow electric current in the second drive coil. This does not induce a magnetic field around the second drive coil. Therefore, the second prism holding member 81 does not rotate around the shaft 65 and slant with respect to the Y axis because a magnetic loop generated by the second yoke 84, the second magnet 85 and the second back yoke 86 is not disturbed. This means that the image fluctuation correcting apparatus 60 does not carry out image fluctuation correcting operation. That is, in the case where the image fluctuation correcting apparatus 60 does not flow electric current in the second drive coil in order not to carry out image fluctuation correcting operation in the reference position at the initial time when the second rotary apex angle prism 36 does not rotate, bias force acts to the second drive coil so that a flux content of the N pole 85a is about the same as one of the S pole 85b, while a magnetic filed is generated by the second yoke 84, the second magnet 85 and the second back yoke 86. This keeps the second rotary apex angle prism 36 at a center position α0 of the predetermined angle range ±α2 without being affected by a capture position of video camera 10B at the initial time because the second prism holding member 81 keeps the center position α0 so as to be opposed to a center portion of the magnetic gap portion 85c.

Under a condition where the N pole 85a and the S pole 85b are respectively located at +X side and −X side in the second magnet 85, when the image fluctuation correcting apparatus 60 flows electric current in the second drive coil in a counter-clockwise direction of the second drive coil as viewed from the subject side, a magnetic field is induced in a cavity portion surrounded by the second drive coil toward the subject side. The induced magnetic field affects the magnetic loop to rotate the second prism holding member 81 around the shaft 65 in −α direction shown in FIG. 12 (−X side shown in FIG. 2C). This means that the image fluctuation correcting apparatus 60 carries out image fluctuation correcting operation.

On the other hand, when the image fluctuation correcting apparatus 60 flows electric current in the second drive coil in a clockwise direction of the second drive coil as viewed from the subject side, a magnetic field is induced in the cavity portion surrounded by the second drive coil toward the back side. The induced magnetic field affects the magnetic loop to rotate the second prism holding member 81 around the shaft 65 in +α direction shown in FIG. 12 (+X side shown in FIG. 2C). This means that the image fluctuation correcting apparatus 60 carries out image fluctuation correcting operation.

That is, when the image fluctuation correcting apparatus 60 flows in the second drive coil electric current for rotating the second rotary apex angle prism 36 in a direction for canceling the vertical fluctuation of captured image in order to carry out image fluctuation correcting operation according to the amount of vertical fluctuation of captured image with respect to the second rotary apex angle prism 36, the second prism holding member 81 is drawn toward a side of the N pole 85a (or the S pole 85b) by electromagnetic force generated between the second drive coil and the N pole 85a (or the S pole 85b). This rotates the second prism holding member 81 by desired degrees around the shaft 65 according to the vertical fluctuation of captured image.

The second angle sensor 25 is opposed to the magnetic gap portion 85c with gap width, which is formed on a center portion of the second magnetic 85 and separates the N pole 85a from the S pole 85b, in the reference position at the initial time when the second rotary apex angle prism 36 does not rotate. The second angle sensor 25 generates an output value (e.g. voltage value) based on magnitude of magnetic flux density detected thereby.

The gap width of magnetic gap portion 85c is set so that the output value from the second angle sensor 25 linearly increases from a maximum rotation angle +α2 (+X side) to a minimum rotation angle −α2 (−X side) of the second rotary apex angle prism 36 as shown in FIG. 7. In the reference position at the initial time when the second rotary apex angle prism 36 does not rotate, the output value from the second angle sensor 25 represents that magnetic flux density is zero. Therefore, the control unit 21 can precisely detect a rotation angle of the second rotary apex angle prism 36 based on the output value from the second angle sensor 25.

The advantageous feature of the image fluctuation correcting apparatus 60 will be described below.

Even if the video camera 10B vibrates in a vertical direction and/or a horizontal direction thereof, the image fluctuation correcting apparatus 60 can easily cancel a vertical fluctuation and/or a horizontal fluctuation of the image A of subject because the control unit 21 flows electric current in the first drive coil and/or the second drive coil via the rotary apex angle prism drive circuit 26 to rotate the first rotary apex angle prism 35 and/or the second rotary apex angle prism 36 in a desired direction(s). This realizes that a good image A of subject is obtained and provides the image fluctuation correcting apparatus 60 with a simple and small structure in comparison with the image fluctuation correcting apparatus 30.

Figure 13:
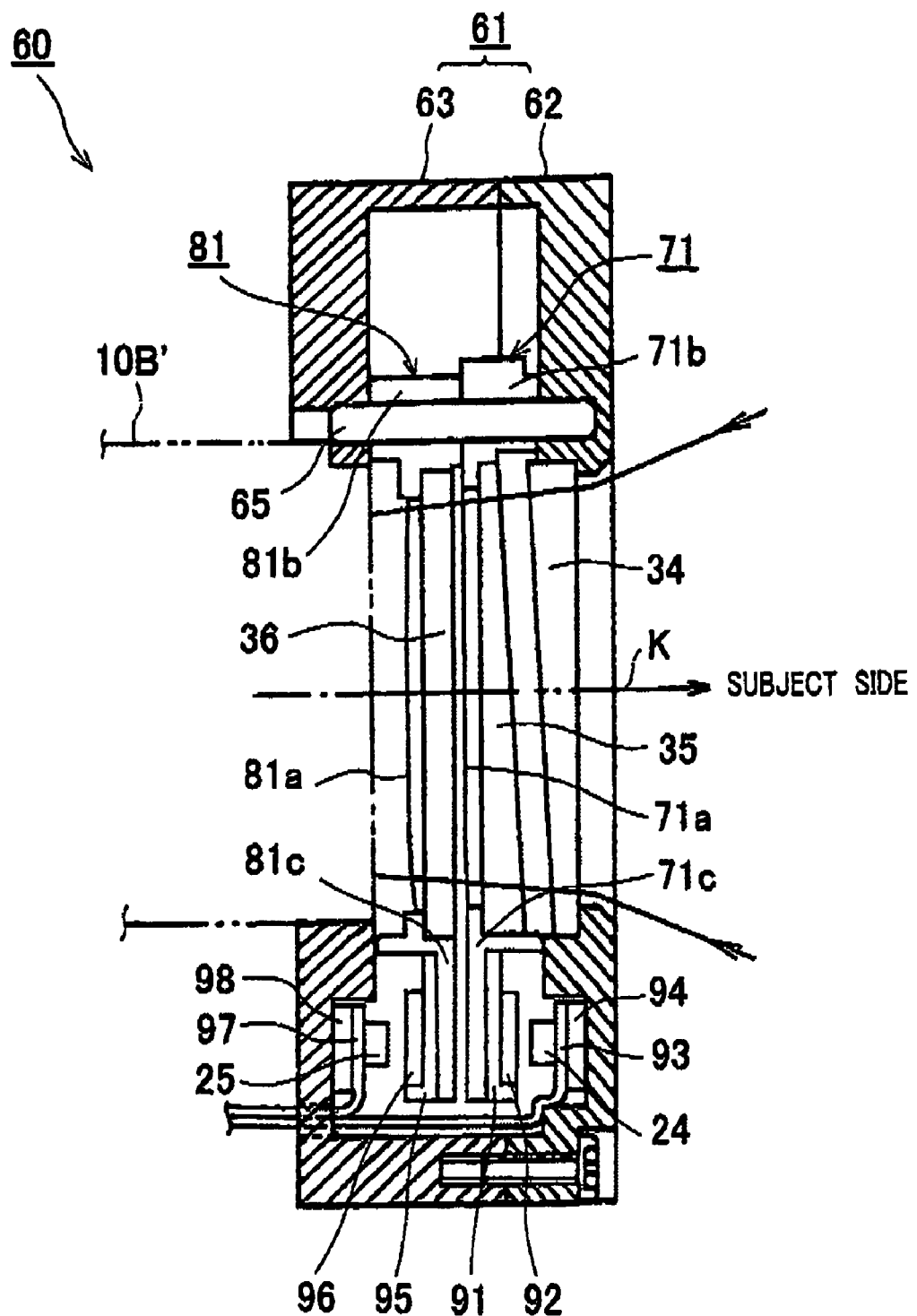
FIG. 13 is an enlarged vertical cross-sectional view of a modified image fluctuation correcting apparatus according to the second exemplary embodiment of the present invention.

Next, an image fluctuation correcting apparatus 60' according to a modified example of the second exemplary embodiment of the present invention will be described below in detail, with reference to FIG. 13. If members of the image fluctuation correcting apparatus 60' are the same as those of the image fluctuation correcting apparatus 60, the same numbers as those of the image fluctuation correcting apparatus 60 are assigned to the members of the image fluctuation correcting apparatus 60α. If members of the image fluctuation correcting apparatus 60' are different from those of the image fluctuation correcting apparatus 60, new numbers are assigned to the members of the image fluctuation correcting apparatus 60'.

The image fluctuation correcting apparatus 60' differs from the image fluctuation correcting apparatus 60 in the configurations of first and second electromagnetic actuators for rotating the first and second rotary apex angle prisms 35 and 36 held in the first and second prism holding members 71 and 81 around the shaft 65 in the frame body 61 within a predetermined angle range. In this modified example, the technical idea of first exemplary embodiment is applied to the configurations of first and second electromagnetic actuators.

In the first electromagnetic actuator, a first magnet 92, which is formed by sandwiching a magnetic gap portion between an N pole and an S pole and magnetizing an assembly of them, is attached to the member attachment portion 71c at a front surface of the member attachment portion 71c via an L-letter shaped first yoke 91. Further, a first printed circuit drive coil board 93 having a first drive coil (not shown) and a first back yoke 94 are fixed to a lower region in the front frame body 62 so as to be opposed to and away from the first magnet 92. The first angle sensor 24 using the hall element is soldered on the first printed circuit drive coil board 93 so as to be opposed to the first magnet 92.

As well, in the second electromagnetic actuator, a second magnet 96, which is formed by sandwiching a magnetic gap portion between an N pole and an S pole and magnetizing an assembly of them, is attached to the member attachment portion 81c at a rear surface of the member attachment portion 81c via an L-letter shaped second yoke 95. Further, a second printed circuit drive coil board 97 having a second drive coil (not shown) and a second back yoke 98 are fixed to a lower region in the second frame body 63 so as to be opposed to and away from the second magnet 96. The second angle sensor 25 using the hall element is soldered on the second printed circuit drive coil board 97 so as to be opposed to the second magnet 96.

The first printed circuit drive coil board 93 and the second printed circuit drive coil board 97 are drawn outside at a side of the rear frame body 63. This prevents the first and second printed circuit drive coil boards 93 and 97 from moving and breaking.

Therefore, the image fluctuation correcting apparatus 60' surely rotates the first rotary apex angle prism 35 and/or the second rotary apex angle prism 36 around the shaft 65 in the frame body 61 a desired degree(s) using the first electromagnetic actuator and/or the second electromagnetic actuator, and surely detects rotation angles of the first and second rotary apex angle prisms 35 and 36 using the first and second angle sensors 24 and 25.

In the first and second exemplary embodiments, although the first and second electromagnetic actuators are applied to the image fluctuation correcting apparatus as drive sources for rotating the first and second rotary apex angle prisms a desired degree(s), small piezo elements may be attached to the first and second prism holding members and applied to the image fluctuation correcting apparatus as the drive sources, instead of the first and second electromagnetic actuators.

What is claimed is:

1. An image fluctuation correcting apparatus that rotates one or more apex angle prisms along a plane nearly perpendicular to an optical axis of image lenses in a frame body arranged on the optical axis of image lenses by means of electromagnetic force according to an amount of fluctuation of a captured image, and cancels the amount of fluctuation to correct image fluctuation, comprising:
   one or more shafts that are substantially parallel to the optical axis and laterally installed in the frame body;
   one or more prism holding members that each includes a frame portion holding one apex angle prism and a shaft bush portion connected to the frame portion so as to be perpendicular to the one apex angle prism, and capable of rotating around a corresponding shaft fitted to the shaft bush portion within a predetermined angle range, together with the one apex angle prism;
   one or more rotary yokes that each is fixed to a corresponding shaft bush portion so as to be located at a side opposed to a corresponding frame portion;
   one or more magnets that each is magnetized into a N pole and a S pole and fixed to the corresponding shaft bush portion so as to be located at the side opposed to the corresponding frame portion;
   one or more back yokes that each is attached to an outer peripheral portion of the frame body; and
   one or more drive coils that each is wound so as to surround a corresponding magnet and attached to the outer peripheral portion of the frame body,
   wherein one apex angle prism is rotated together with a corresponding prism holding member by electromagnetic force generated between a corresponding magnet and a corresponding drive coil by flowing in the corresponding drive coil electric current for rotating the corresponding prism holding member in a direction for canceling the amount of fluctuation.

2. The image fluctuation correcting apparatus according to claim 1, wherein, in a reference position where the corresponding prism holding member holding the one apex angle prism does not rotate, bias force acts to the corresponding drive coil in which the electric current does not flow so that a flux content of the N pole of the corresponding magnet is about the same as one of the S pole of the corresponding magnet, which keeps the one apex angle prism at a center position of the predetermined angle range.

3. The image fluctuation correcting apparatus according to claim 1, wherein
the one or more apex angle prisms are composed of a fixed apex angle prism fixed in the frame body, a first rotary apex angle prism to be rotated according to an amount of horizontal fluctuation, and a second rotary apex angle prism to be rotated according to an amount of vertical fluctuation,
the one or more shafts are composed of a first shaft, and a second shaft located 180-degree angle away from the first shaft, and
the one or more prism holding members are composed of a first prism holding member rotatably supported by the first shaft and holding the first rotary apex angle prism, and a second prism holding member rotatably supported by the second shaft and holding member holding the second rotary apex angle prism.

4. An image fluctuation correcting apparatus that rotates one or more apex angle prisms along a plane nearly perpendicular to an optical axis of image lenses in a frame body arranged on the optical axis of image lenses by means of electromagnetic force according to an amount of fluctuation of a captured image, and cancels the amount of fluctuation to correct image fluctuation, comprising:
one or more shafts that are substantially parallel to the optical axis and laterally installed in the frame body;
one or more prism holding members that each includes a frame portion holding one apex angle prism and a shaft bush portion connected to the frame portion so as to be perpendicular to the one apex angle prism, and capable of rotating around a corresponding shaft fitted to the shaft bush portion within a predetermined angle range, together with the one apex angle prism;
one or more rotary yokes that each is fixed to a corresponding shaft bush portion so as to be located at a side opposed to a corresponding frame portion;
one or more magnets that each is magnetized into a N pole and a S pole and fixed to the corresponding shaft bush portion so as to be located at the side opposed to the corresponding frame portion;
one or more back yokes that each is attached to an outer peripheral portion of the frame body;
one or more drive coils that each is wound so as to surround a corresponding magnet and attached to the outer peripheral portion of the frame body; and
one or more hall elements that each is attached to the outer peripheral portion of the frame body so as to be opposed to a magnetic gap portion of the corresponding magnet in a reference position where the corresponding prism holding member holding the one apex angle prism does not rotate,
wherein, in a condition where a width of the magnetic gap portion of a corresponding magnet is set to a predetermined gap width in which a magnetic flux density linearly increases, a corresponding hall element detects a rotation angle of one apex angle prism rotated together with a corresponding prism holding member.

5. An image fluctuation correcting apparatus that rotates a first apex angle prism and a second apex angle prism along a plane nearly perpendicular to an optical axis of image lenses in a frame body arranged on the optical axis of image lenses by means of electromagnetic force according to an amount of fluctuation of a captured image, and cancels the amount of fluctuation to correct image fluctuation, comprising:
a shaft that is substantially parallel to the optical axis and laterally installed in the frame body;
a first prism holding member that includes a frame portion holding the first apex angle prism and a shaft bush portion connected to the frame portion so as to be perpendicular to the first apex angle prism, and capable of rotating around the shaft fitted to the shaft bush portion within a predetermined angle range, together with the first apex angle prism;
a second prism holding member that includes a frame portion holding the second apex angle prism and is opposed to the first apex angle prism and a shaft bush portion connected to the frame portion so as to be perpendicular to the second apex angle prism, and capable of rotating around the shaft fitted to the shaft bush portion within a predetermined angle range, together with the second apex angle prism;
a first electromagnetic actuator that rotates the first prism holding member holding the first apex angle prism in a direction for canceling the amount of fluctuation; and
a second electromagnetic actuator that rotates the second prism holding member holding the second apex angle prism in a direction for canceling the amount of fluctuation.

6. The image fluctuation correcting apparatus according to claim 5, wherein
the first electromagnetic actuator comprises:
a first drive coil board with a first drive coil that is attached to a member attachment portion connected to the frame portion so as to be located at a side opposed to the shaft bush portion of the first prism holding member;
a first magnet that is fixed to one surface side in the frame body so as to be opposed to the first drive coil board;
a first yoke that is fixed to the one surface side in the frame body so as to be opposed to the first drive coil board; and
a first back yoke that is fixed in the frame body so as to be opposed to the first yoke via the first drive coil board, and
the second electromagnetic actuator comprises:
a second drive coil board with a second drive coil that is attached to a member attachment portion connected to the frame portion so as to be located at a side opposed to the shaft bush portion of the second prism holding member;
a second magnet that is fixed to the other surface side in the frame body so as to be opposed to the first drive coil board;
a second yoke that is fixed to the other surface side in the frame body so as to be opposed to the second drive coil board; and
a second back yoke that is fixed in the frame body so as to be opposed to the second yoke via the second drive coil board.

7. The image fluctuation correcting apparatus according to claim 5, wherein
the first electromagnetic actuator comprises:
a first yoke that is attached to a member attachment portion connected to the frame portion so as to be located at a side opposed to the shaft bush portion of the first prism holding member; and
a first magnet that is attached to the member attachment portion connected to the frame portion so as to be located at the side opposed to the shaft bush portion of the first prism holding member;

a first drive coil board with a first drive coil that is fixed to one surface side in the frame body so as to be opposed to the first magnet; and a first back yoke that is fixed to the one surface side in the frame body so as to be opposed to the first magnet, and the second electromagnetic actuator comprises:

a second yoke that is attached to a member attachment portion connected to the frame portion so as to be located at a side opposed to the shaft bush portion of the second prism holding member; and a second magnet that is attached to the member attachment portion connected to the frame portion so as to be located at the side opposed to the shaft bush portion of the second prism holding member;

a second drive coil board with a second drive coil that is fixed to the other surface side in the frame body so as to be opposed to the second magnet; and a second back yoke that is fixed to the other surface side in the frame body so as to be opposed to the second magnet.

8. The image fluctuation correcting apparatus according to claim 6, wherein in a reference position where the first prism holding member holding the first apex angle prism does not rotate, bias force acts to the first drive coil in which electric current does not flow so that a flux content of a N pole of the first magnet is about the same as one of a S pole of the first magnet, which keeps the first apex angle prism at a center position of the predetermined angle range, and in a reference position where the second prism holding member holding the second apex angle prism does not rotate, bias force acts to the second drive coil in which electric current does not flow so that a flux content of a N pole of the second magnet is about the same as one of a S pole of the second magnet, which keeps the second apex angle prism at a center position of the predetermined angle range.

9. The image fluctuation correcting apparatus according to claim 7, wherein in a reference position where the first prism holding member holding the first apex angle prism does not rotate, bias force acts to the first drive coil in which electric current does not flow so that a flux content of a N pole of the first magnet is about the same as one of a S pole of the first magnet, which keeps the first apex angle prism at a center position of the predetermined angle range, and in a reference position where the second prism holding member holding the second apex angle prism does not rotate, bias force acts to the second drive coil in which electric current does not flow so that a flux content of a N pole of the second magnet is about the same as one of a S pole of the second magnet, which keeps the second apex angle prism at a center position of the predetermined angle range.

10. The image fluctuation correcting apparatus according to claim 6, wherein a first hall element that detects a rotation angle of the first apex angle prism is mounted to the first drive coil board so as to be opposed to the first magnet, and a second hall element that detects a rotation angle of the second apex angle prism is mounted to the second drive coil board so as to be opposed to the second magnet.

11. The image fluctuation correcting apparatus according to claim 7, wherein a first hall element that detects a rotation angle of the first apex angle prism is mounted to the first drive coil board so as to be opposed to the first magnet, and a second hall element that detects a rotation angle of the second apex angle prism is mounted to the second drive coil board so as to be opposed to the second magnet.

* * * * *